(12) United States Patent
Asaoka et al.

(10) Patent No.: US 9,453,946 B2
(45) Date of Patent: Sep. 27, 2016

(54) LIGHT-DIFFUSING MEMBER HAVING POLARIZING PLATE, PRODUCTION METHOD FOR LIGHT-DIFFUSING MEMBER HAVING POLARIZING PLATE, AND DISPLAY DEVICE

(71) Applicant: Sharp Kabushiki Kaisha, Osaka-shi, Osaka (JP)

(72) Inventors: Yasushi Asaoka, Osaka (JP); Tsuyoshi Maeda, Osaka (JP); Emi Yamamoto, Osaka (JP); Toru Kanno, Osaka (JP); Shohei Katsuta, Osaka (JP); Hideomi Yui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/438,257

(22) PCT Filed: Oct. 24, 2013

(86) PCT No.: PCT/JP2013/078810
§ 371 (c)(1),
(2) Date: Apr. 24, 2015

(87) PCT Pub. No.: WO2014/065363
PCT Pub. Date: May 1, 2014

(65) Prior Publication Data
US 2015/0285963 A1    Oct. 8, 2015

(30) Foreign Application Priority Data

Oct. 26, 2012 (JP) .................................. 2012-237122

(51) Int. Cl.
*G02B 5/02* (2006.01)
*G02B 5/30* (2006.01)
*G02F 1/1335* (2006.01)

(52) U.S. Cl.
CPC ........... *G02B 5/0257* (2013.01); *G02B 5/0242* (2013.01); *G02B 5/0268* (2013.01); *G02B 5/0278* (2013.01); *G02B 5/3033* (2013.01); *G02F 1/133504* (2013.01); *G02F 1/133512* (2013.01); *G02F 1/133524* (2013.01); *G02F 2001/133562* (2013.01); *Y10T 29/49885* (2015.01)

(58) Field of Classification Search
CPC G02B 5/0257; G02B 5/3033; G02B 5/0278; G02B 5/0242; G02B 5/0268; G02F 1/133512; G02F 1/133504; G02F 2001/133562; G02F 1/133524; Y10T 29/49885
See application file for complete search history.

(56) References Cited

FOREIGN PATENT DOCUMENTS

JP        2000-352608 A        12/2000

*Primary Examiner* — Donald Raleigh
*Assistant Examiner* — Kevin Quarterman
(74) *Attorney, Agent, or Firm* — Keating & Bennett, LLP

(57) ABSTRACT

Provided is a display device including a light-diffusing member that includes a substrate, a plurality of light-shielding layers, and a light-diffusing section, and a polarizing plate. The light-diffusing member is configured to diffuse light, which is incident from a polarizing plate side, in an anisotropic manner, the light-diffusing section has a light-emitting end surface that is in contact with the substrate, a light-incident end surface that is opposite to the light-emitting end surface and has an area larger than an area of the light-emitting end surface, and a reflective surface that is in contact with the light-emitting end surface and the light-incident end surface and reflects light incident from the light-incident end surface, a height of the light-diffusing section from the light-incident end surface to the light-emitting end surface is set to be larger than a layer thickness of the light-shielding layers, and an azimuth angle direction in which diffusibility of the light-diffusing member is relatively strong, and a transmission axis of the polarizing plate are approximately parallel with each other.

20 Claims, 27 Drawing Sheets

40H

40I

40J

40K

40L

LIGHT-DIFFUSING MEMBER HAVING POLARIZING PLATE, PRODUCTION METHOD FOR LIGHT-DIFFUSING MEMBER HAVING POLARIZING PLATE, AND DISPLAY DEVICE

TECHNICAL FIELD

The present invention relates to a light-diffusing member having a polarizing plate, a method of producing the light-diffusing member having the polarizing plate, and a display device.

Priority is claimed on Japanese Patent Application No. 2012-237122, filed Oct. 26, 2012, the content of which is incorporated herein by reference.

BACKGROUND ART

A liquid crystal display device has been widely used as a display in a portable electronic apparatus including a portable telephone, a television, a personal computer, and the like. In general, in the liquid crystal display device, visibility on a front side is excellent, but a viewing angle is narrow. According to this, various efforts have been made to make the viewing angle wide. As one such effort, a configuration, in which a member (hereinafter, referred to as a light-diffusing member) for controlling a diffusion angle of light that is emitted from a display body such as a liquid crystal panel is provided on a viewing side of the display body, has been suggested.

For example, in PTL 1, to be described later, a light-diffusing sheet, in which a groove having a V-shaped cross-section is provided in a light-diffusing layer, and a light-absorbing layer is provided in a portion of the groove, is disclosed. In the light-diffusing sheet, a transparent sheet formed from polyethylene terephthalate (PET) and the like is disposed on a light-incidence side and a light-emission side of the light-diffusing layer. A portion of light that is vertically incident to the light-diffusing layer is totally reflected from a wall surface of the groove, and is emitted. According to this, light that is emitted from the light-diffusing sheet is diffused.

CITATION LIST

Patent Literature

PTL 1: Japanese Unexamined Patent Application Publication No. 2000-352608

SUMMARY OF INVENTION

Technical Problem

However, in a case where the light-diffusing sheet is disposed on a light-emission side of a display device, in accordance with a polarization state of light that is emitted from the display device, light that is incident to the light-diffusing layer at a relatively high incidence angle is apt to be reflected from the wall surface of the groove. As a result, there is a problem in that contrast decreases, and thus display quality decreases.

The invention has been made to solve the above-described problem, and an object thereof is to provide a light-diffusing member having a polarizing plate which is capable of improving contrast, and a method of producing the light-diffusing member having the polarizing plate. Another object of the invention is to provide a display device which is provided with the light-diffusing member having the polarizing plate, and thus has excellent display quality.

Solution to Problem

To accomplish the objects, the invention employs the following configurations.

(1) According to an aspect of the invention, there is provided a light-diffusing member having a polarizing plate. The light-diffusing member having a polarizing plate includes: a light-diffusing member including a light-transmissive substrate, a plurality of light-shielding layers which are formed on one surface of the substrate, and a light-diffusing section that is formed in regions on the one surface of the substrate other than regions in which the light-shielding layers are formed; and a polarizing plate that is disposed on a side opposite to a substrate side of the light-diffusing member. The light-diffusing member is configured to diffuse light, which is incident from a polarizing plate side, in an anisotropic manner in an azimuth angle direction viewed from a normal direction of the substrate. The light-diffusing section has a light-emitting end surface that is in contact with the substrate, a light-incident end surface that is opposite to the light-emitting end surface and has an area larger than an area of the light-emitting end surface, and a reflective surface that is in contact with the light-emitting end surface and the light-incident end surface and reflects light incident from the light-incident end surface. A height of the light-diffusing section from the light-incident end surface to the light-emitting end surface is set to be larger than a layer thickness of the light-shielding layers. An azimuth angle direction in which diffusibility of the light-diffusing member is relatively strong, and a transmission axis of the polarizing plate are approximately parallel with each other.

(2) In the light-diffusing member having a polarizing plate according to (1), a planar shape of the light-shielding layers when viewed from a normal direction of one surface of the substrate may be an anisotropic shape that has at least a major axis and a minor axis.

(3) In the light-diffusing member having a polarizing plate according to (2), the planar shape of the light-shielding layers when viewed from the normal direction of the one surface of the substrate may be an elliptical shape or a polygonal shape.

(4) In the light-diffusing member having a polarizing plate according to (2) or (3), the plurality of light-shielding layers may have at least one among a plurality of kinds of sizes and shapes which are different from each other when viewed from the normal direction of the one surface of the substrate.

(5) In the light-diffusing member having a polarizing plate according to any one of (1) to (4), hollow portions, which are partitioned by the regions in which the light-diffusing section is formed, may be formed in the regions in which the light-shielding layers are formed, and air may exist in the hollow portions.

(6) According to another aspect of the invention, there is provided a light-diffusing member having a polarizing plate. The light-diffusing member having a polarizing plate includes: a light-diffusing member including a light-transmissive substrate, a plurality of light-diffusing sections which are formed on one surface of the substrate, and a light-shielding layer that is formed in regions on the one surface of the substrate other than regions in which the light-diffusing sections are formed; and a polarizing plate that is disposed on a side opposite to a substrate side of the light-diffusing member. The light-diffusing member is configured to diffuse light, which is incident from a polarizing plate side, in an anisotropic manner in an azimuth angle direction viewed from a normal direction of the substrate. The light-diffusing sections have a light-emitting end surface that is in contact with the substrate, a light-incident end surface that is opposite to the light-emitting end surface and has an area larger than an area of the light-emitting end surface, and a reflective surface that is in contact with the light-emitting end surface and the light-incident end surface and reflects light incident from the light-incident end surface. A height of the light-diffusing sections from the light-incident end surface to the light-emitting end surface is set to be larger than a layer thickness of the light-shielding layer. An azimuth angle direction in which diffusibility of the light-diffusing member is relatively strong, and a transmission axis of the polarizing plate are approximately parallel with each other.

(7) In the light-diffusing member having a polarizing plate according to (6), a planar shape of the light-diffusing sections when viewed from a normal direction of one surface of the substrate may be an anisotropic shape that has at least a major axis and a minor axis.

(8) In the light-diffusing member having a polarizing plate according to (7), the planar shape of the light-diffusing sections when viewed from the normal direction of the one surface of the substrate may be an elliptical shape or a polygonal shape.

(9) In the light-diffusing member having a polarizing plate according to (7) or (8), the plurality of light-diffusing sections may have at least one among a plurality of kinds of sizes and shapes which are different from each other when viewed from the normal direction of the one surface of the substrate.

(10) In the light-diffusing member having a polarizing plate according to any one of (6) to (9), air may exist in gaps between the plurality of light-diffusing sections.

(11) In the light-diffusing member having a polarizing plate according to any one of (6) to (10), when the light-diffusing member is viewed from a cross-section that is cut-out along a plane including the normal direction of the one surface of the substrate and the azimuth angle direction in which the diffusibility of the light-diffusing member is relatively strong, an inclination angle of a side surface of at least one light-diffusing section among the plurality of light-diffusing sections may be different from an inclination angle of a side surface of other light-diffusing sections.

(12) In the light-diffusing member having a polarizing plate according to any one of (6) to (11), when the light-diffusing member is viewed from a cross-section that is cut-out along a plane including the normal direction of the one surface of the substrate and the azimuth angle direction in which the diffusibility of the light-diffusing member is relatively strong, an inclination angle of a side surface of at least one light-diffusing section among the plurality of light-diffusing sections may be different depending on location.

(13) In the light-diffusing member having a polarizing plate according to any one of (6) to (12), a member, which has a refractive index between a refractive index of the polarizing plate and a refractive index of the substrate, may be provided between the polarizing plate and the substrate.

(14) In the light-diffusing member having a polarizing plate according to any one of (1) to (13), a light-scattering portion may be partially formed on a surface of the substrate which is opposite to the one surface.

(15) In the light-diffusing member having a polarizing plate according to any one of (1) to (13), at least a part of a surface of the light-shielding layer, which is opposite to the substrate, may be covered with a light-scattering portion.

(16) In the light-diffusing member having a polarizing plate according to any one of (1) to (15), at least one of an anti-reflective layer, an antistatic layer, an anti-glare treatment layer, and an anti-fouling treatment layer may be provided on a surface of the substrate which is opposite to the one surface.

(17) According to still another aspect of the invention, there is provided a method of producing a light-diffusing member having a polarizing plate. The method includes: a step of forming a plurality of light-shielding layers on one surface of a light-transmissive substrate; a step of forming a light-transmissive negative type photosensitive resin layer on the one surface of the substrate so as to cover the plurality of light-shielding layers; a step of irradiating the negative type photosensitive resin layer with diffused light from a surface of the substrate, which is opposite to the one surface on which the light-shielding layers and the negative type photosensitive resin layer are formed, through the substrate in regions other than regions in which the light-shielding layers are formed; a step of preparing a light-diffusing member configured to diffuse light, which is incident from a light-incident end surface side of the light-diffusing section, in an anisotropic manner in an azimuth angle direction viewed from a normal direction of the substrate by developing the negative type photosensitive resin layer after completion of the irradiation with the diffused light to form the light-diffusing section, which has a light-emitting end surface that is in contact with the substrate, a light-incident end surface which is opposite to the light-emitting end surface and has an area larger than an area of the light-emitting end surface, and a reflective surface that is in contact with the light-emitting end surface and the light-incident end surface and reflects light incident from the light-incident end surface, on one surface of the substrate; and a step of attaching a polarizing plate to the light-incident end surface of the light-diffusing section of the light-diffusing member to prepare the light-diffusing member having the polarizing plate. In the step of preparing the light-diffusing member having the polarizing plate, an azimuth angle direction in which diffusibility of the light-diffusing member is relatively strong, and a transmission axis of the polarizing plate are made to be approximately parallel with each other.

(18) According to still another aspect of the invention, there is provided a method of producing a light-diffusing member having a polarizing plate. The method includes: a step of forming a light-shielding layer, which has a plurality of openings, on one surface of a light-transmissive substrate; a step of forming a light-transmissive negative type photosensitive resin layer on the one surface of the substrate so as to cover the plurality of openings; a step of irradiating the negative type photosensitive resin layer with diffused light from a surface of the substrate, which is opposite to the one surface on which the light-shielding layer and the negative type photosensitive resin layer are formed, through the substrate of the openings; a step of preparing a light-diffusing member configured to diffuse light, which is incident from a light-incident end surface side of the light-diffusing section, in an anisotropic manner in an azimuth angle direction viewed from a normal direction of the substrate by developing the negative type photosensitive resin layer after completion of the irradiation with the diffused light to form the light-diffusing section, which has a light-emitting end surface that is in contact with the substrate, a light-incident end surface which is opposite to the light-emitting end surface and has an area larger than an area of the light-emitting end surface, and a reflective surface that is in contact with the light-emitting end surface and the light-incident end surface and reflects light incident from the light-incident end surface, on one surface of the substrate; and a step of attaching a polarizing plate to the light-incident end surface of the light-diffusing section of the light-diffusing member to prepare the light-diffusing member having the polarizing plate. In the step of preparing the light-diffusing member having the polarizing plate, an azimuth angle direction in which diffusibility of the light-diffusing member is relatively strong, and a transmission axis of the polarizing plate are made to be approximately parallel with each other.

(19) In the method of producing a light-diffusing member having a polarizing plate according to (17) or (18), as a material of the light-shielding layer, any one of a black resin, a black ink, an elementary metal substance, and a multilayer film of the elementary metal substance and a metal oxide may be used.

(20) According to still another aspect of the invention, there is provided a display device including: a display body; and a viewing angle enlarging member which is provided on a visual recognition side of the display body, and emits light in a state in which an angle distribution of the light incident from the display body is broadened from an angle distribution prior to incidence. The viewing angle enlarging member is constituted of the light-diffusing member having the polarizing plate according to any one of (1) to (5), the display body has a plurality of pixels which constitute a display image, and a maximum size of a plurality of light-shielding layers of the light-diffusing member is smaller than a pixel size of the display body.

(21) According to still another aspect of the invention, there is provided a display device including: a display body; and a viewing angle enlarging member which is provided on a visual recognition side of the display body, and emits light in a state in which an angle distribution of the light incident from the display body is broadened from an angle distribution prior to incidence. The viewing angle enlarging member is constituted of the light-diffusing member having the polarizing plate according to any one of (6) to (12), the display body has a plurality of pixels which constitute a display image, and a maximum pitch between light-diffusing sections adjacent to each other among the plurality of light-diffusing sections of the light-diffusing member is smaller than a pitch between the pixels of the display body.

Advantageous Effects of Invention

According to the aspects of the invention, it is possible to provide a light-diffusing member having a polarizing plate which is capable of improving contrast, and a method of producing the light-diffusing member having a polarizing plate. In addition, according to the aspects of the invention, it is possible to provide a display device which is provided with the light-diffusing member having a polarizing plate, and has excellent display quality.

DESCRIPTION OF EMBODIMENTS

First Embodiment

Hereinafter, a first embodiment of the invention will be described with reference to FIGS. 1 to 18.

In this embodiment, as a display device, a liquid crystal display device provided with a transmissive liquid crystal panel (display body) will be described as an example.

In addition, in the following drawings, so as to improve visibility of respective constituent elements, dimensional scales may be made different in accordance with the constituent elements.

Figure 1:
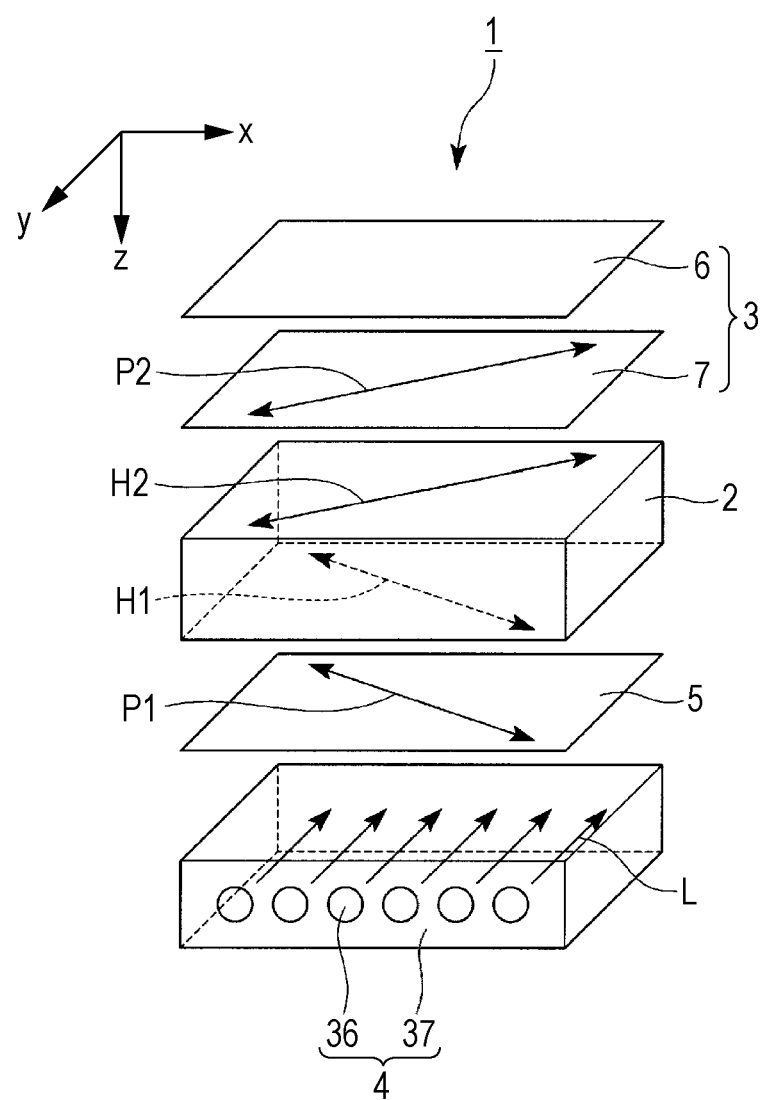
FIG. 1 is a perspective view illustrating a schematic configuration of a liquid crystal display device according to a first embodiment.
Figure 2:
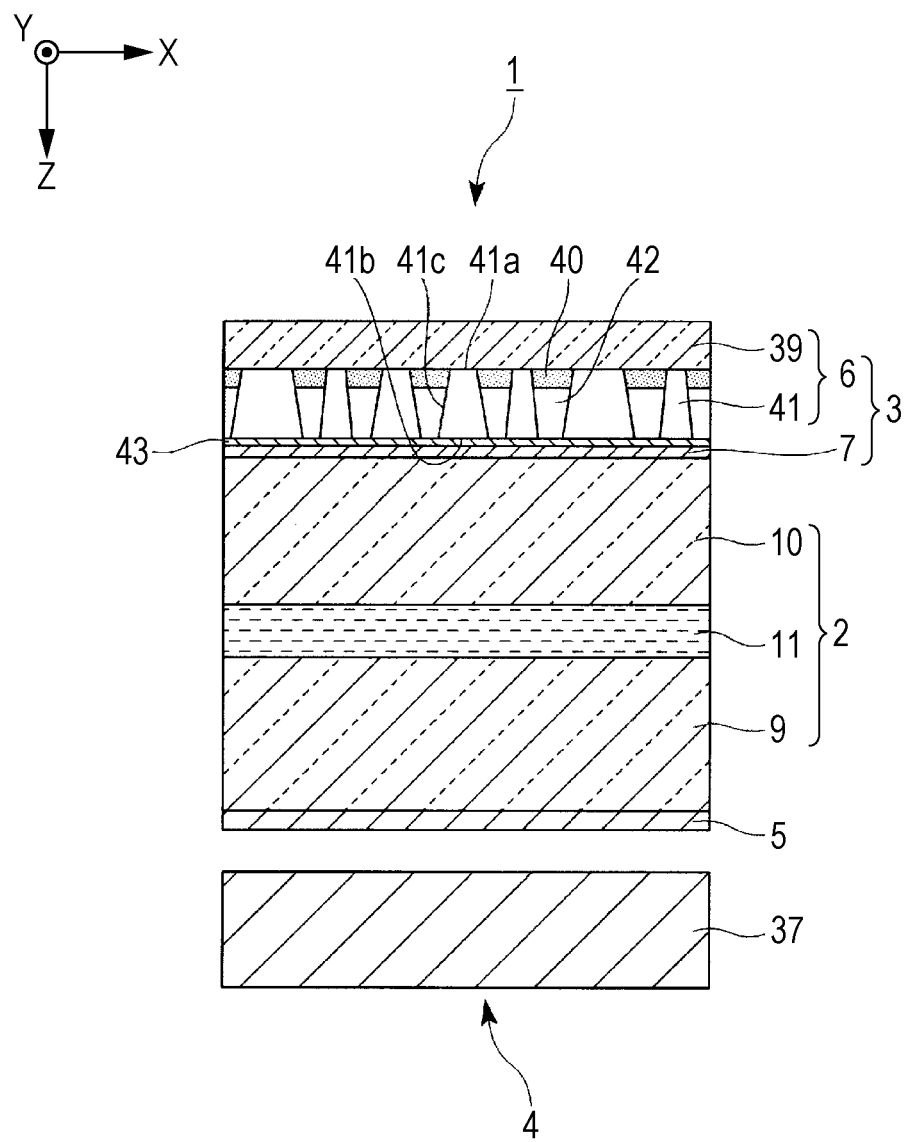
FIG. 2 is a cross-sectional view of the liquid crystal display device.

FIG. 1 is a perspective view of a liquid crystal display device of this embodiment when viewed from an obliquely upper side thereof (visual recognition side). FIG. 2 is a cross-sectional view of the liquid crystal display device.

As illustrated in FIGS. 1 and 2, a liquid crystal display device 1 of this embodiment includes a backlight 4 (illuminating device), a first polarizing plate 5, a liquid crystal panel 2, a viewing angle enlarging member 3 (a light-diffusing member having a polarizing plate). The viewing angle enlarging member 3 includes a light-diffusing member 6 and a second polarizing plate 7. The second polarizing plate 7 of this embodiment corresponds to a polarizing plate that constitutes a "light-diffusing member having a polarizing plate" in claims.

In FIG. 1, the liquid crystal panel 2 is schematically illustrated as one sheet having a plate shape, but a detailed structure thereof will be described later.

An observer views display from an upper side of the liquid crystal display device 1 in FIG. 1 in which the viewing angle enlarging member 3 is disposed. In the following description, a side in which the viewing angle enlarging member 3 is disposed is referred to as a visual recognition side, and a side in which the backlight 4 is disposed is referred to as a rear surface side. In addition, in the following description, an x-axis is defined as a horizontal direction of a screen of the liquid crystal display device 1, a y-axis is defined as a vertical direction of the screen of the liquid crystal display device 1, and a z-axis is defined as a thickness direction of the liquid crystal display device 1.

In the liquid crystal display device 1 of this embodiment, light that is emitted from the backlight 4 is modulated in the liquid crystal panel 2, and a predetermined image, characters, and the like are displayed by the modulated light. In addition, when light that is emitted from the liquid crystal panel 2 is transmitted through the viewing angle enlarging member 3, light is emitted from the viewing angle enlarging member 3 in a state in which light distribution (diffusion angle distribution) of emitted light is further spread out in comparison to light distribution prior to incidence into the viewing angle enlarging member 3. According to this, an observer can visually recognize display with a wide viewing angle.

Hereinafter, a specific configuration of the liquid crystal panel 2 will be described.

Here, an active matrix type transmissive liquid crystal panel will be described as an example. However, a liquid crystal panel that is applicable to the invention is not limited to the active matrix type transmissive liquid crystal panel. For example, the liquid crystal panel that is applicable to the invention may be a transflective (transmissive and reflective) liquid crystal panel. In addition, the liquid crystal panel may be a liquid crystal panel of a simple matrix type in which each pixel is not provided with a thin film transistor (hereinafter, abbreviated as a TFT) for switching.

Figure 3:
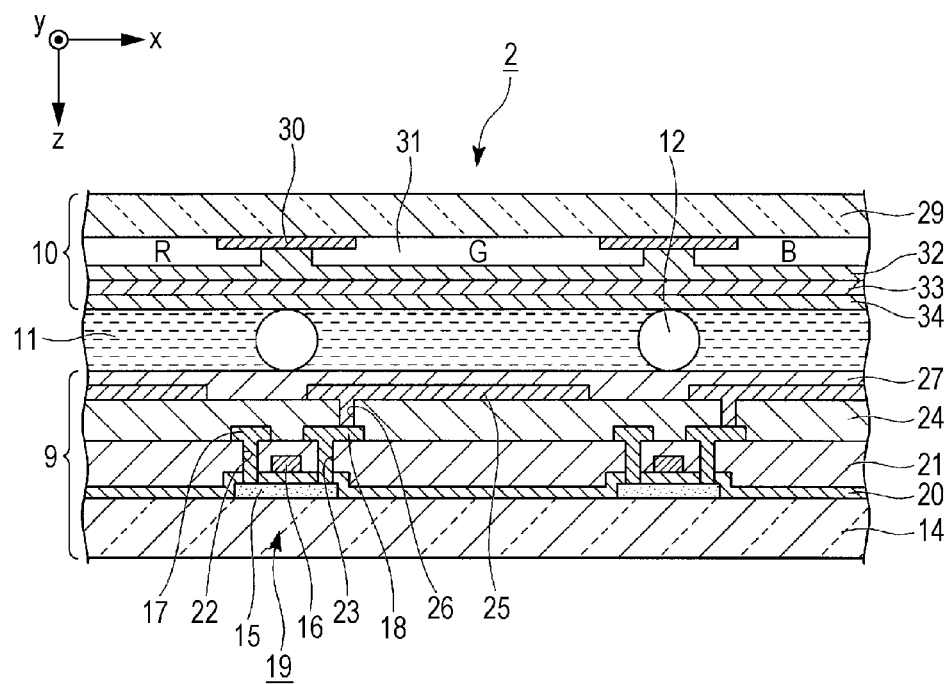
FIG. 3 is a longitudinal cross-sectional view of a liquid crystal panel.

FIG. 3 is a longitudinal cross-sectional view of the liquid crystal panel 2.

As illustrated in FIG. 3, the liquid crystal panel 2 includes a TFT substrate 9, a color filter substrate 10, and a liquid crystal layer 11. The TFT substrate 9 functions as a switching element substrate.

The color filter substrate 10 is disposed to face the TFT substrate 9. The liquid crystal layer 11 is interposed between the TFT substrate 9 and the color filter substrate 10.

The liquid crystal layer 11 is enclosed in a space surrounded by the TFT substrate 9, the color filter substrate 10, and a frame-shaped sealing member (not illustrated). The sealing member bonds the TFT substrate 9 and the color filter substrate 10 to each other with a predetermined gap therebetween.

For example, the liquid crystal panel 2 of this embodiment performs display in a twisted Nematic (TN) mode.

Liquid crystals having positive dielectric anisotropy are used in the liquid crystal layer 11. A spacer 12 is disposed between the TFT substrate 9 and the color filter substrate 10. The spacer 12 has a spherical shape or a columnar shape. The spacer 12 constantly maintains a gap between the TFT substrate 9 and the color filter substrate 10.

The display mode of the liquid crystal panel 2 of the invention is not limited to the TN mode. For example, a vertical alignment (VA) mode, a super twisted Nematic (STN) mode, an in-plane switching (IPS) mode, a fringe field switching (FFS) mode, and the like may be used.

Although not illustrated, a plurality of pixels are arranged in the TFT substrate 9 in a matrix shape. Each of the pixels is a minimum unit region of display. In the TFT substrate 9, a plurality of source bus lines are formed to extend in parallel with each other. In the TFT substrate 9, a plurality of gate bus lines are formed to extend in parallel with each other. The plurality of gate bus lines are perpendicular to the plurality of source bus lines. The plurality of source bus lines and the plurality of gate bus lines are formed on the TFT substrate 9 in a lattice shape. A rectangular region, which is partitioned by the source bus lines adjacent to each other and the gate bus lines adjacent to each other, becomes one pixel. Each of the source bus lines is connected to a source electrode 17 of a TFT 19. Each of the gate bus lines is connected to a gate electrode 16 of the TFT 19.

The TFT 19, which includes a semiconductor layer 15, the gate electrode 16, the source electrode 17, a drain electrode 18, and the like, is formed on a surface on a liquid crystal layer 11 side of a transparent substrate 14 that constitutes the TFT substrate 9.

As the transparent substrate 14, for example, a glass substrate may be used.

The semiconductor layer 15 is formed on the transparent substrate 14. As a material of the semiconductor layer 15, for example, a semiconductor material such as continuous grain silicon (CGS), low-temperature poly-silicon (LPS), and α-Si (amorphous silicon) is used.

A gate insulating film 20 is formed on the transparent substrate 14 so as to cover the semiconductor layer 15.

As a material of the gate insulating film 20, for example, a silicon oxide film, a silicon nitride film, a laminated film of these films, and the like are used.

The gate electrode 16 is formed on the gate insulating film 20 so as to face the semiconductor layer 15. As a material of the gate electrode 16, for example, a laminated film of tungsten (W)/tantalum nitride (TaN), molybdenum (Mo), titanium (Ti), aluminum (Al), and the like are used.

A first interlayer insulating film 21 is formed on the gate insulating film 20 so as to cover the gate electrode 16. As a material of the first interlayer insulating film 21, for example, a silicon oxide film, a silicon nitride film, a laminated film of these films, and the like are used.

The source electrode 17 and the drain electrode 18 are formed on the first interlayer insulating film 21. A contact hole 22 and a contact hole 23 are formed in the first interlayer insulating film 21 and the gate insulating film 20 so as to pass through the first interlayer insulating film 21 and the gate insulating film 20.

The source electrode 17 is connected to a source region of the semiconductor layer 15 through the contact hole 22. The drain electrode 18 is connected to a drain region of the semiconductor layer 15 through the contact hole 23. As a material of the source electrode 17 and the drain electrode 18, the same conductive material as that of the gate electrode 16 is used.

A second interlayer insulating film 24 is formed on the first interlayer insulating film 21 so as to cover the source electrode 17 and the drain electrode 18. As a material of the second interlayer insulating film 24, the same material as that of the first interlayer insulating film 21, or an organic insulating material is used.

A pixel electrode 25 is formed on the second interlayer insulating film 24. A contact hole 26 is formed in the second interlayer insulating film 24 so as to pass through the second interlayer insulating film 24. The pixel electrode 25 is connected to the drain electrode 18 through the contact hole 26. The pixel electrode 25 is connected to the drain region of the semiconductor layer 15 by using the drain electrode 18 as a relay electrode.

As a material of the pixel electrode 25, for example, a transparent conductive material such as indium thin oxide (ITO) and indium zinc oxide (IZO) is used.

According to the configuration, when a scanning signal is supplied through the gate bus line, and thus the TFT 19 enters an on-state, an image signal that is supplied to the source electrode 17 through the source bus line is supplied to the pixel electrode 25 through the semiconductor layer 15 and the drain electrode 18. In addition, an alignment film 27 is formed on the entire surface of the second interlayer insulating film 24 so as to cover the pixel electrode 25. The alignment film 27 has an alignment regulation force for horizontally aligning liquid crystal molecules which constitute the liquid crystal layer 11. In addition, the TFT 19 may be a top gate type TFT that is illustrated in FIG. 3, or a bottom gate type TFT.

On the other hand, a black matrix 30, a color filter 31, a planarization layer 32, a counter electrode 33, and an alignment film 34 are sequentially formed on a surface on a liquid crystal layer 11 side of the transparent substrate 29 that constitutes the color filter substrate 10.

The black matrix 30 has a function of blocking the transmission of light in a region between pixels. For example, the black matrix 30 is formed from a metal such as chromium (Cr) and a multi-layer film of Cr/Cr oxide, or a photoresist obtained by dispersing carbon particles in a photosensitive resin.

Dyes of respective colors of red (R), green (G), and blue (B) are included in the color filter 31. The color filter 31 of any one of R, G, and B is disposed to face one pixel electrode 25 on the TFT substrate 9. In addition, the color filter 31 may have a multi-color configuration of three or more colors including R, G, and B.

The planarization layer 32 is constituted as an insulating film that covers the black matrix 30 and the color filter 31. The planarization layer 32 has a function of mitigating and planarizing a step difference, which occurs due to the black matrix 30 and the color filter 31.

The counter electrode 33 is formed on the planarization layer 32. As a material of the counter electrode 33, the same transparent conductive material as that of the pixel electrode 25 is used.

The alignment film 34 is formed on the entire surface of the counter electrode 33. The alignment film 34 has an alignment regulation force for horizontally aligning liquid crystal molecules which constitute the liquid crystal layer 11.

Returning to FIG. 1, the backlight 4 includes a light source 36 and a light guide body 37. The light source 36 is disposed on an end surface of the light guide body 37. As the light source 36, for example, a light-emitting diode, a cold-cathode tube, and the like are used.

The backlight 4 of this embodiment is an edge light type backlight.

The light guide body 37 has a function of guiding light, which is emitted from the light source 36, to the liquid crystal panel 2. As a material of the light guide body 37, for example, a resin material such as an acrylic resin is used.

Light, which is incident to the end surface of the light guide body 37 from the light source 36, propagates while being totally reflected on the inside of the light guide body 37, and is emitted from an upper surface (light emission surface) of the light guide body 37 with an approximately uniform intensity. Although not illustrated, a scattering sheet and a prism sheet are disposed on the upper surface of the light guide body 37. The light, which is emitted from the upper surface of the light guide body 37, is scattered by the scattering sheet and is condensed by the prism sheet, and is emitted in an approximately parallelized manner. As the prism sheet, for example, BEF (product name) manufactured by Sumitomo 3M Limited is used.

A first polarizing plate 5 is provided between the backlight 4 and the liquid crystal panel 2. The first polarizing plate 5 functions as a polarizer. Here, an angle is illustrated in a counter clockwise direction in a state in which a positive direction of an x-axis direction is set as a reference. In this state, a transmission axis P1 of the first polarizing plate 5 is set to a direction of 135° or 315°.

The second polarizing plate 7 is provided on a liquid crystal panel 2 side of the viewing angle enlarging member 3, that is, between the liquid crystal panel 2 and the light-diffusing member 6. The second polarizing plate 7 functions as a polarizer. A transmission axis P2 of the second polarizing plate 7 is arranged to be perpendicular to the transmission axis P1 of the first polarizing plate 5. The transmission axis P2 of the second polarizing plate 7 is set to a direction of 45° or 225°. The transmission axis P1 of the first polarizing plate 5 and the transmission axis P2 of the second polarizing plate 7 are arranged in a cross-nicol arrangement.

Next, the light-diffusing member 6 will be described in detail.

Figure 4:
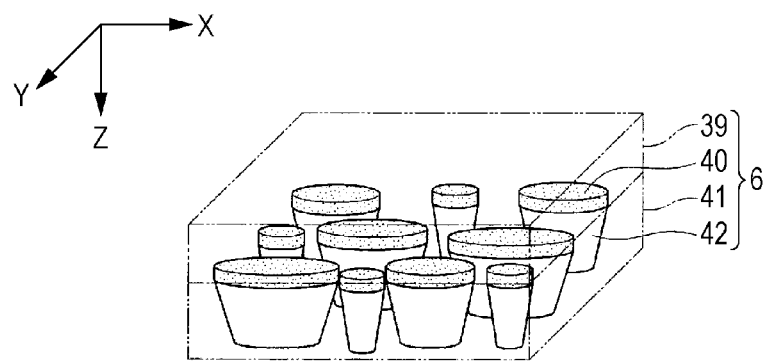
FIG. 4 is a perspective view illustrating a light-diffusing member.

FIG. 4 is a perspective view when the light-diffusing member 6 is viewed from a visual recognition side.

As illustrated in FIG. 4, the light-diffusing member 6 includes a substrate 39, a plurality of light-shielding layers 40, and a light-diffusing section 41. The plurality of light-shielding layers 40 are formed on one surface (surface on a rear surface side) of the substrate 39. The light-diffusing section 41 is formed in a region on the one surface of the substrate 39 other than a region in which the light-shielding layers 40 are formed.

As illustrated in FIG. 2, the light-diffusing member 6 is disposed on the second polarizing plate 7 in the following posture. That is, a side in which a light-diffusing section 41 is provided faces the second polarizing plate 7, and a substrate 39 side faces a visual recognition side. The light-diffusing member 6 is fixed to the second polarizing plate 7 through an adhesive layer 43.

For example, as a substrate 39, a substrate, which is formed from a transparent resin such as a triacetyl cellulose (TAC) film, a polyethylene terephthalate (PET) film, a polycarbonate (PC) film, a polyethylene naphthalate (PEN) film, and a polyether sulfone (PES) film, is preferably used. The substrate 39 becomes a base during the subsequent application of a material of the light-shielding layer 40 or the light-diffusing section 41 in a producing process. It is desirable for the substrate 39 to have heat resistance and mechanical strength during a heat treatment step in the producing process. Accordingly, in addition to the resin substrate, a glass substrate, and the like may be used as the substrate 39. However, it is preferable that the thickness of the substrate 39 is small to a certain extent in which the heat resistance or the mechanical strength is not damaged. The reason for the preference is as follows. As the thickness of the substrate 39 increases, there is a concern that blurring of display may occur. In addition, it is preferable that the total light transmittance of the substrate 39 is 90% or higher in accordance with regulation JIS K7361-1. When the total light transmittance is 90% or greater, it is possible to achieve sufficient transparency.

In this embodiment, a transparent resin material having a thickness of 100 μm is used as an example.

The light-shielding layers 40 are randomly disposed when viewed from a normal direction of a main surface of the substrate 39. As an example, the light-shielding layers 40 are constituted of an organic material such as a black resist and a black ink which have light absorbing properties and photosensitivity. In addition to the material, a metal film constituted of chromium (Cr) and a multi-layer film of Cr/Cr oxide may be used.

For example, the light-diffusing section 41 is constituted of an organic material such as an acrylic resin and an epoxy resin which have optical transparency and photosensitivity. In addition, it is preferable that the total light transmission of the light-diffusing section 41 is 90% or greater in accordance with regulation JIS K7361-1. When the total light transmittance is 90% or greater, it is possible to obtain sufficient transparency.

As illustrated in FIG. 2, the light-diffusing section 41 includes a light-emitting end surface 41a, a light-incident end surface 41b, and a reflective surface 41c. The light-emitting end surface 41a is a surface that is in contact with the substrate 39. The light-incident end surface 41b is a surface that is opposite to the light-emitting end surface 41a. The reflective surface 41c is a tapered side surface of the light-diffusing section 41. The reflective surface 41c is a surface that reflects light that is incident from the light-incident end surface 41b. An area of the light-incident end surface 41b is larger than an area of the light-emitting end surface 41a.

The light-diffusing section 41 is a portion that contributes to light transmission in the light-diffusing member 6. That is, light that is incident to the light-diffusing section 41 is emitted after being guided in a state of being approximately closed at the inside of the light-diffusing section 41 while being totally reflected from the reflective surface 41c of the light-diffusing section 41.

The light-diffusing member 6 is disposed in such a manner that the substrate 39 faces a visual recognition side. According to this, in the two opposite surfaces of the light-diffusing section 41, the surface having a smaller area becomes the light-emitting end surface 41a. On the other hand, the surface having a larger area becomes the light-incident end surface 41b.

An inclination angle (an angle made by the light-incident end surface 41b and the reflective surface 41c) of the reflective surface 41c of the light-diffusing section 41 is preferably 75° to 85°. In this embodiment, the inclination angle of the reflective surface 41c of the light-diffusing section 41 is set to 75°. However, the inclination angle of the reflective surface 41c of the light-diffusing section 41 is not particularly limited as long as the inclination angle is set to an angle at which incident light is capable of being sufficiently diffused during emission from the light-diffusing member 6. In this embodiment, the inclination angle of the reflective surface 41c of the light-diffusing section 41 is set to be constant.

A height of the light-diffusing section 41 from the light-incident end surface 41b to the light-emitting end surface 41a is set to be larger than the layer thickness of the light-shielding layers 40. In this embodiment, the layer thickness of the light-shielding layer 40 is approximately 150 nm as an example. A height of the light-diffusing section 41 from the light-incident end surface 41b to the light-emitting end surface 41a is approximately 20 μm as an example. A portion, which is surrounded by the reflective surface 41c of the light-diffusing section 41 and each of the light-shielding layers 40 is set as a hollow portion 42.

In addition, it is desirable for a refractive index of the substrate 39 and a refractive index of the light-diffusing section 41 to be substantially the same as each other. The reason for this is as follows. For example, consideration will be given to a case where the refractive index of the substrate 39 and the refractive index of the light-diffusing section 41 are very different from each other. In this case, when light incident from the light-incident end surface 41b is emitted from the light-diffusing section 41, unnecessary light refraction or reflection may occur on an interface between the light-diffusing section 41 and the substrate 39. In this case, the following problems and the like occur. Specifically, a desired viewing angle is not obtained, and the amount of emission light decreases.

In this embodiment, air exists in the hollow portion 42 (the outside of the light-diffusing section 41). According to this, for example, when assuming that the light-diffusing section 41 is formed from a transparent acrylic resin, the reflective surface 41c of the light-diffusing section 41 becomes an interface between the transparent acrylic resin and the air. Here, the hollow portion 42 may be filled with a different material having a low refractive index. However, a difference in a refractive index at the interface between the inside and the outside of the light-diffusing section 41 becomes maximized in a case where air exists at the outside in comparison to a case where an arbitrary material having a low refractive index exists at the outside.

Accordingly, in accordance with Snell's law, a threshold angle in the configuration of this embodiment becomes minimized, and an incidence angle range in which light is totally reflected from the reflective surface 41c of the light-diffusing section 41 becomes broadest. As a result, light loss is further suppressed, and thus high luminance can be obtained.

In addition, in this embodiment, the existence of a material having a low refractive index indicates that the periphery of the light-diffusing section 41 is set to a low-refractive-index state for realization of total reflection of light. According to this, a state in which the hollow portion 42 is filled with an inert gas such as nitrogen instead of the air is also included in this embodiment. Alternatively, the inside of the hollow portion 42 may be set to a vacuum state or a decompressed state in comparison to the air.

Figure 5:
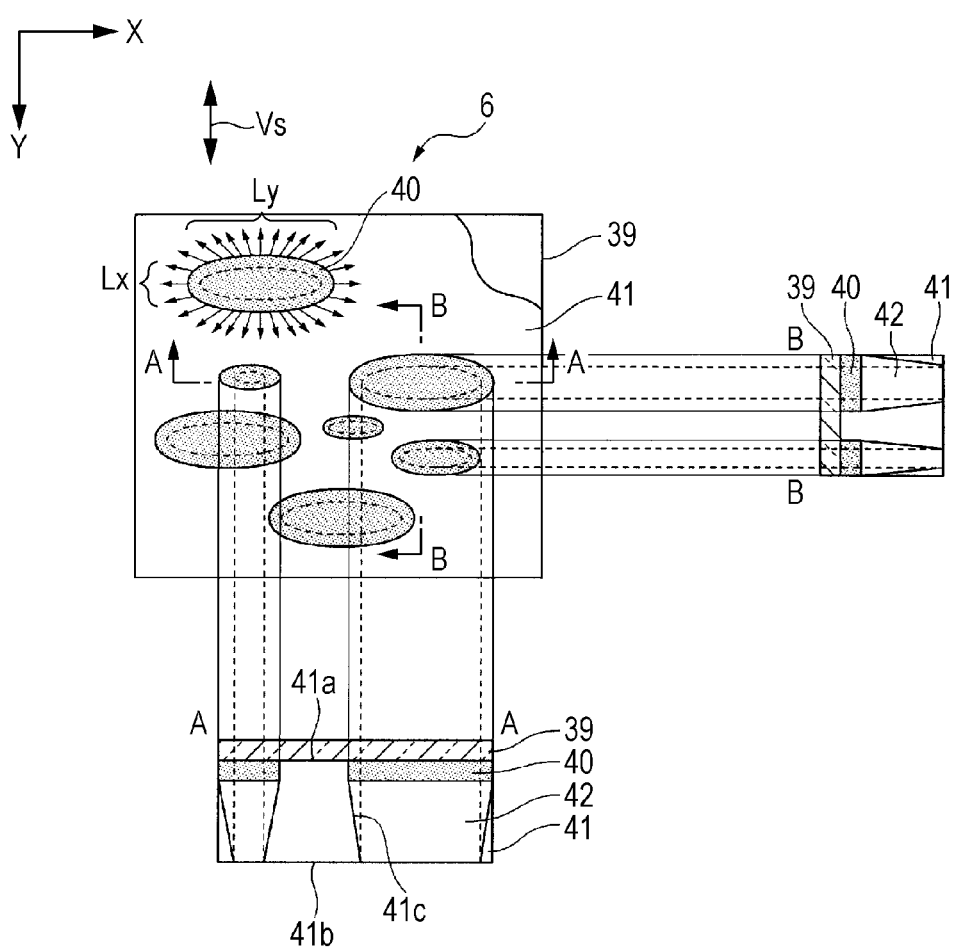
FIG. 5 is a plan view of the light-diffusing member.

FIG. 5 is a schematic view of the light-diffusing member 6. In FIG. 5, a left-upper section represents a plan view of the light-diffusing member 6. A left-lower section represents a cross-sectional view taken along line A-A in the plan view on the left-upper section. A right-upper section represents a cross-sectional view taken along line B-B in the plan view on the left-upper section.

As illustrated in the left-upper section of FIG. 5, in the light-diffusing member 6 of this embodiment, the plurality of light-shielding layers 40 are provided on one surface of the substrate 39 in a scattered manner. A planar shape of each of the light-shielding layers 40 when viewed from a normal direction of the substrate 39 is an elongated elliptical shape. The light-shielding layer 40 has a major axis and a minor axis. Here, the major axis is set as the longest axis in the planar shape of the light-shielding layer 40 when viewed from the normal direction of the substrate 39. The minor axis is set as the shortest axis in the planar shape of the light-shielding layer 40 when viewed from the normal direction of the substrate 39. In the light-diffusing member 6 of this embodiment, a ratio of the length of the minor axis to the length of the major axis is approximately the same in each of the light-shielding layers 40.

As illustrated in the left-lower section and the right-upper section of FIG. 5, a portion, which corresponds to the lower side of the light-shielding layer 40, becomes the hollow portion 42 having a truncated elliptical cone shape. The light-diffusing member 6 has a plurality of the hollow portions 42. The light-diffusing section 41 is continuously provided at a portion other than the plurality of hollow portions 42.

In the light-diffusing member 6 of this embodiment, a major axis direction (hereinafter, may be referred to as a major axis direction of a light-shielding layer) of an ellipse, which constitutes a planar shape of each of the light-shielding layers 40, is approximately aligned to the X-direction. A minor axis direction (hereinafter, may be referred to as a minor axis direction of a light-shielding layer) of the ellipse, which constitutes the planar shape of each of the light-shielding layers 40, is approximately aligned to the Y-direction. According to this, when considering a direction of the reflective surface 41c of the light-diffusing section 41, in the reflective surface 41c of the light-diffusing section 41, a ratio of the reflective surface 41c along the X-direction is larger than a ratio of the reflective surface 41c along the Y-direction. According to this, the amount of light Ly that is reflected from the reflective surface 41c along the X-direction and is diffused to the Y-direction is greater than the amount of light Lx that is reflected from the reflective surface 41c along the Y-direction and is diffused to the X-direction.

Accordingly, an azimuth angle direction Vs in which diffusibility of the light-diffusing member 6 is strongest becomes the Y-direction that is the minor axis direction of the light-shielding layer 40. A polar angle direction is set in an arbitrary manner. Definitions of the polar angle and the azimuth angle will be described later.

However, in a case where the planar shape of the light-shielding layer is a circular shape, in the reflective surface of the light-diffusing section, a ratio of a reflective surface along the X-direction is the same as a ratio of a reflective surface along the Y-direction. According to this, light that is reflected from the reflective surface along the X-direction and is diffused to the Y-direction becomes the same as light that is reflected from the reflective surface along the Y-direction and is diffused to the X-direction. That is, when viewed from the normal direction of the substrate, light is reflected from the reflective surface in an isotropic manner. Accordingly, the azimuth angle direction, in which the diffusibility of the light-diffusing member is strongest, is not present.

Returning to FIG. 1, an alignment control direction of the alignment film 27 of the TFT substrate 9 is indicated by an arrow H1. On the other hand, an alignment control direction of the alignment film 34 of the color filter substrate 10 is indicated by an arrow H2.

The alignment film 27 is subjected to an alignment treatment such as rubbing in order for the alignment control direction H1 to become 135° or 315°. On the other hand, the alignment film 34 is subjected to an alignment treatment such as rubbing in order for the alignment control direction H2 to become 45° or 225°.

Figure 6A:
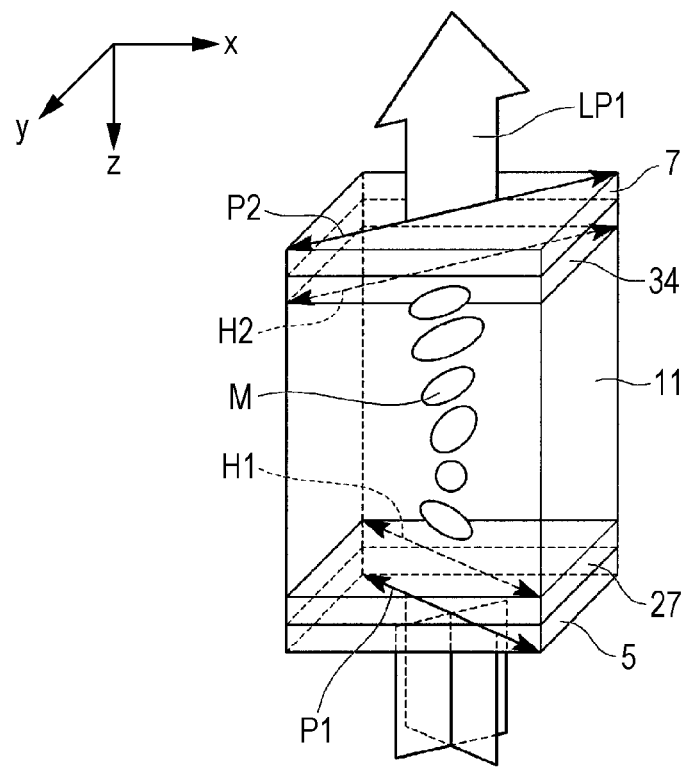
FIG. 6A is a view illustrating an operation of the liquid crystal panel.
Figure 6B:
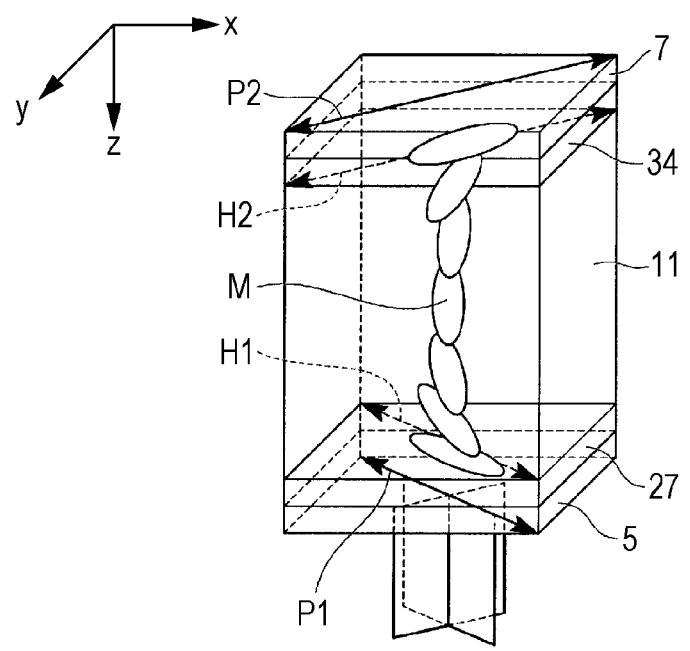
FIG. 6B is a view illustrating an operation of the liquid crystal panel.

FIGS. 6A and 6B are views illustrating operation of the liquid crystal panel 2.

FIG. 6A is a view illustrating a state in which a voltage is not applied to the liquid crystal panel 2 (between the pixel electrode 25 and the counter electrode 33 in FIG. 3) (during non-application of a voltage). FIG. 6B is a view illustrating a state in which a constant voltage is applied to the liquid crystal panel 2 (during application of a voltage). In addition, in FIGS. 6A and 6B, a reference numeral M represents liquid crystal molecules which constitute the liquid crystal layer 11.

During non-application of a voltage, as illustrated in FIG. 6A, the liquid crystal molecules M enter a state of being twisted by 90° between the alignment film 27 and the alignment film 34. At this time, a polarization plane of linearly polarized light, which is transmitted through the first polarizing plate 5 having the transmission axis P1 in a direction of 135° or 315°, is rotated by 90° due to optical activity in the liquid crystal layer 11. According to this, the linearly polarized light, which is transmitted through the first polarizing plate 5, is transmitted through the second polarizing plate 7 having the transmission axis P2 in a direction of 45° or 225°. As a result, during non-application of a voltage, white display is performed.

During application of a voltage, as illustrated in FIG. 6B, the liquid crystal molecules M enter a state in which the liquid crystal molecules M stand up in a direction along an electric field between the alignment film 27 and the alignment film 34. At this time, the polarization plane of the linearly polarized light, which is transmitted through the first polarizing plate 5 having the transmission axis P1 in a direction of 135° or 315°, is not rotated. According to this, the linearly polarized light, which is transmitted through the first polarizing plate 5, is not transmitted through the second polarizing plate 7 that has the transmission axis P2 in a direction of 45° or 225°. As a result, black display occurs during application of a voltage.

As described above, an image can be displayed by switching white display and black display with each other through control of application and non-application of a voltage for each pixel.

Figure 7:
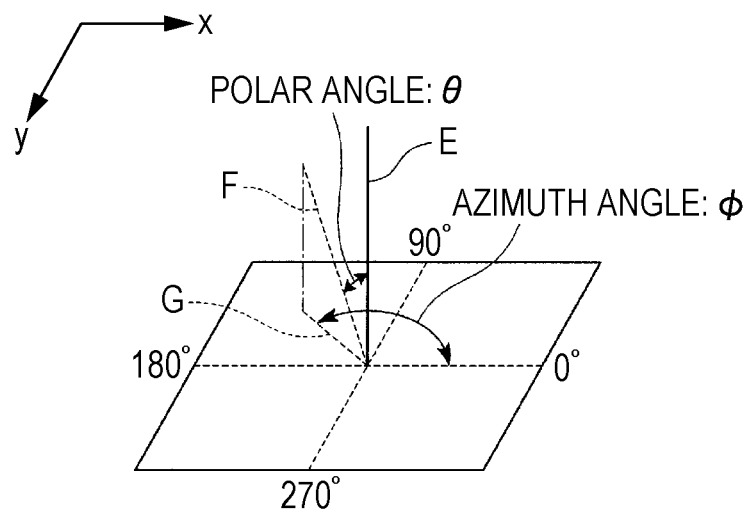
FIG. 7 is a view illustrating a definition of a polar angle and an azimuth angle.

FIG. 7 is a view illustrating the definition of the polar angle and the azimuth angle.

Here, as illustrated in FIG. 7, when a normal direction E of a screen of the liquid crystal display device 1 is set as a reference, an angle made by a visual line direction F of an observer is set as the polar angle θ. When a positive direction (0° direction) of the x-axis is set as a reference and the visual line direction F of the observer is projected onto the screen, an angle made by a direction of a line segment G is set as the azimuth angle φ.

Figure 8:
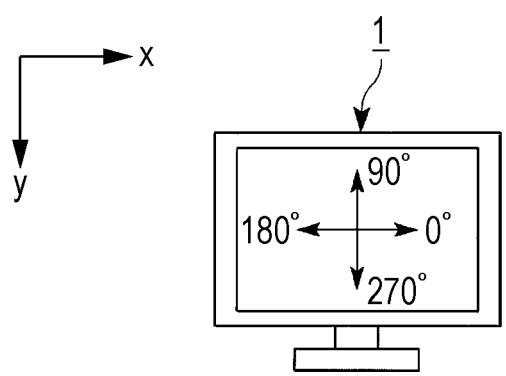
FIG. 8 is a front elevation view of the liquid crystal display device.

FIG. 8 is a front elevation view of the liquid crystal display device 1.

As illustrated in FIG. 8, on the screen of the liquid crystal display device 1, the horizontal direction (x-axis direction) is set to a direction in which the azimuth angle φ is 0° or 180°. In short, the direction in which the azimuth angle φ is 0° or 180° is a right and left direction. Specifically, the direction in which the azimuth angle φ is 0° or 180° is a direction along an axis that is horizontal to a paper plane. The vertical direction (y-axis direction) is set as a direction in which the azimuth angle φ is 90° or 270°. In short, the direction in which the azimuth angle φ is 90° or 270° is an upper and lower direction. Specifically, the direction in which the azimuth angle φ is 90° or 270° is a direction along an axis that is perpendicular to the paper plane.

Figure 9:
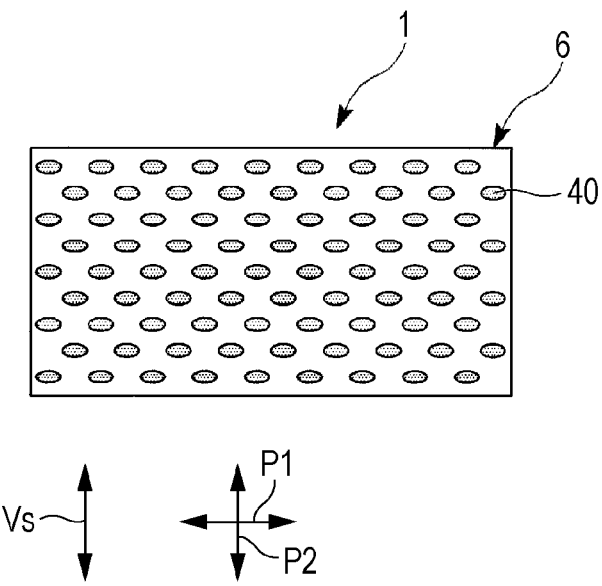
FIG. 9 is a view illustrating a disposition relationship between an azimuth angle direction in which diffusibility of the light-diffusing member is relatively strong, and a transmission axis of a polarizing plate in a front elevation view of the liquid crystal display device.

FIG. 9 is a view illustrating a disposition relationship between an azimuth angle direction Vs in which diffusibility of the light-diffusing member 6 is relatively strong, and a transmission axis of the polarizing plate (the transmission axis P1 of the first polarizing plate 5, the transmission axis P2 of the second polarizing plate 7) in the front elevation view of the liquid crystal display device 1 according to this embodiment. In addition, in FIG. 9, the plurality of light-shielding layers 40 are regularly arranged with the same size as each other for convenience.

As illustrated in FIG. 9, a front elevation shape of the liquid crystal display device 1 of this embodiment is a rectangular shape that is elongated in a right and left direction (horizontally elongated). In this embodiment, the azimuth angle direction Vs, in which the diffusibility of the light-diffusing member 6 is relatively strong is a direction in which the azimuth angle φ is 90° or 270°. According to this, in the liquid crystal display device 1, diffusion strength in an upper and lower direction increases, and the visibility in the upper and lower direction is further improved.

In this embodiment, the azimuth angle direction Vs in which the diffusibility of the light-diffusing member 6 is relatively strong, and the transmission axis P2 of the second polarizing plate 7 are made to be approximately parallel with each other (to match each other). On the other hand, the azimuth angle direction Vs in which the diffusibility of the light-diffusing member 6 is relatively strong, and the transmission axis P1 of the first polarizing plate 5 are made to be perpendicular to each other.

In addition, it is not necessary for the azimuth angle direction Vs in which the diffusibility of the light-diffusing member 6 is relatively strong, and the transmission axis P2 of the second polarizing plate 7 to completely match each other (to be parallel with each other), and the azimuth angle direction Vs and the transmission axis P2 may be approximately parallel with each other. In general, in an assembly step of the liquid crystal display device, it is considered that a deviation in a rotational direction during positional alignment between the liquid crystal panel and the polarizing plate is within approximately 5°. Accordingly, even a case where the azimuth angle direction Vs in which the diffusibility of the light-diffusing member 6 is relatively strong, and the transmission axis P2 of the second polarizing plate 7 deviate from each other at approximately 5° is also included in the technical range of the invention.

(Method of Producing Liquid Crystal Display Device)

Figure 10:
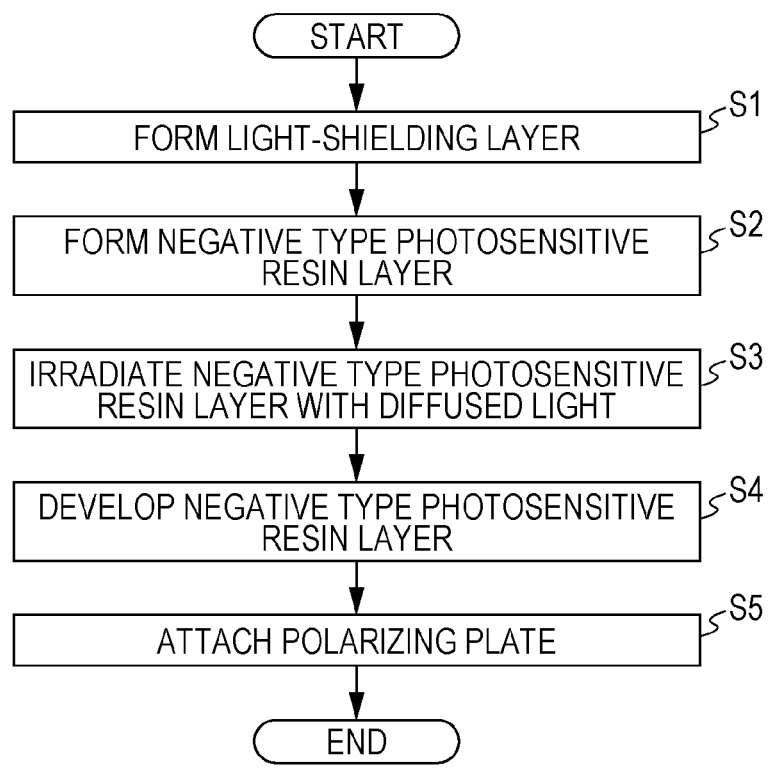
FIG. 10 is a flowchart of a method of producing the light-diffusing member having a polarizing plate.

FIG. 10 is a flowchart illustrating a method of producing the viewing angle enlarging member 3.

FIGS. 11A to 11E are perspective views sequentially illustrating steps of producing the viewing angle enlarging member 3.

Description will be made with respect to the producing method focusing on the steps of producing the viewing angle enlarging member 3 that constitutes the liquid crystal display device 1 having the above-described configuration.

First, an outline of the steps of producing the liquid crystal panel 2 will be described. First, the TFT substrate 9 and the color filter substrate 10 are prepared respectively. Then, a surface of the TFT substrate 9 on which the TFT 19 is formed and a surface of the color filter substrate 10 on which the color filter 31 is formed are disposed to face each other. In addition, the TFT substrate 9 and the color filter substrate 10 are bonded to each other through a sealing member. Then, liquid crystal is injected into a space surrounded by the TFT substrate 9, the color filter substrate 10, and the sealing member. Through the above-described steps, the liquid crystal panel 2 is completed.

The first polarizing plate 5 is bonded to an external surface on a TFT substrate 9 side of the liquid crystal panel 2 that is produced as described above by using an optical adhesive and the like.

In addition, the method of producing the TFT substrate 9 or the color filter substrate 10 may be carried out in accordance with a typical method, and description thereof will be omitted.

Next, steps of producing the viewing angle enlarging member 3 will be described.

As illustrated in FIGS. 11A to 11E, the viewing angle enlarging member 3 is produced by performing various processes using a printing apparatus 50, an application apparatus 55, an exposing apparatus 60, a developing apparatus 65, and a polarizing plate attaching apparatus 70 in this order.

Figure 11A:
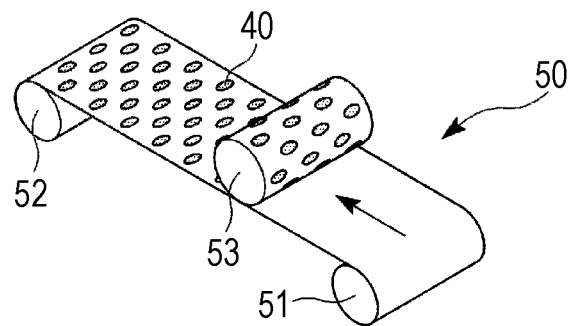
FIG. 11A is a perspective view illustrating a step of producing the light-diffusing member having a polarizing plate according to the first embodiment.

As illustrated in FIG. 11A, the printing apparatus 50 transports a long substrate in a roll-to-roll manner, and performs a printing treatment during transportation. In the printing apparatus 50, a transmitting roller 51 that transmits the substrate is provided at one end, and a winding roller 52 that winds the substrate is provided at the other end. The substrate is configured to be moved from a transmitting roller 51 side toward a winding roller 52 side. A printing roller 53 is provided on an upper side of the substrate.

Figure 11B:
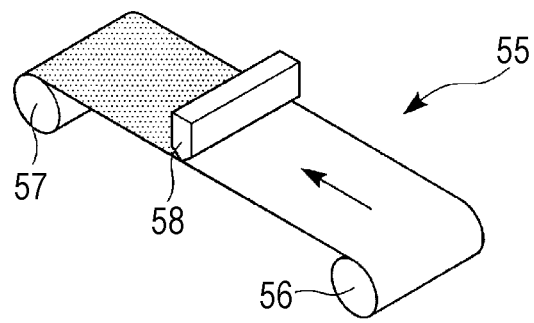
FIG. 11B is a perspective view illustrating a step of producing the light-diffusing member having a polarizing plate according to the first embodiment.

As illustrated in FIG. 11B, the application apparatus 55 transports the substrate, which is subjected to the printing process, in a roll-to-roll manner, and performs an application process during the transportation. In the application apparatus 55, a transmitting roller 56 that transmits the substrate is provided at one end, and a winding roller 57 that winds the substrate is provided at the other end. The substrate is configured to be moved from a transmitting roller 56 side toward a winding roller 57 side. A slit coater 58 is provided on an upper side of the substrate.

Figure 11C:
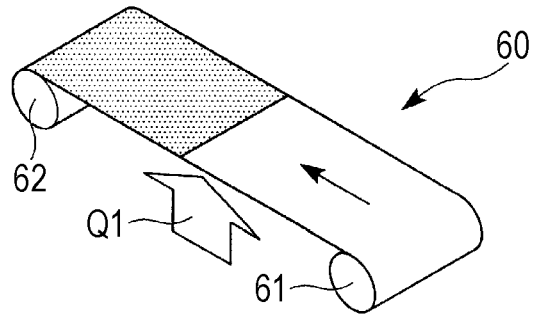
FIG. 11C is a perspective view illustrating a step of producing the light-diffusing member having a polarizing plate according to the first embodiment.

As illustrated in FIG. 11C, the exposing apparatus 60 transports the substrate, which is subjected to the application process, in a roll-to-roll manner, and performs an exposing process during the transportation. In the exposing apparatus 60, a transmitting roller 61 that transmits the substrate is provided at one end, and a winding roller 62 that winds the substrate is provided at the other end. The substrate is configured to be moved from a transmitting roller 61 side toward a winding roller 62 side. A light source (not illustrated) that emits diffused light Q1 is provided on a lower side of the substrate.

Figure 11D:
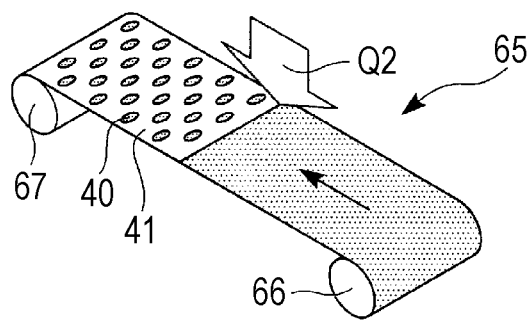
FIG. 11D is a perspective view illustrating a step of producing the light-diffusing member having a polarizing plate according to the first embodiment.

As illustrated in FIG. 11D, the developing apparatus 65 transports the substrate, which is subjected to the exposing process, in a roll-to-roll manner, and performs a developing process during the transportation. In the developing apparatus 65, a transmitting roller 66 that transmits the substrate is provided at one end, and a winding roller 67 that winds the substrate is provided at the other end. The substrate is configured to be moved from a transmitting roller 66 side toward a winding roller 67 side. An apparatus (not illustrated) that ejects a developing solution Q2 is provided on an upper side of the substrate.

Figure 11E:
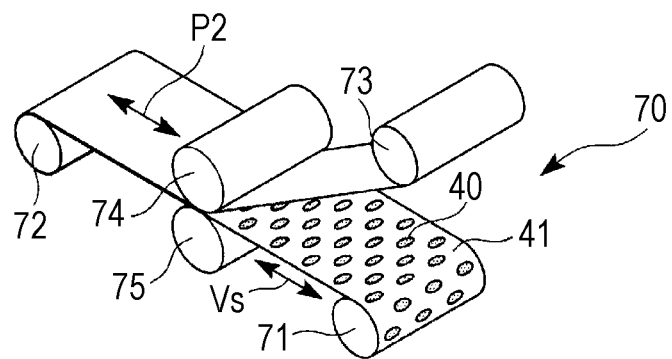
FIG. 11E is a perspective view illustrating a step of producing the light-diffusing member having a polarizing plate according to the first embodiment.

As illustrated in FIG. 11E, the polarizing plate attaching apparatus 70 transports the substrate (parent material of the light-diffusing member), which is subjected to the developing process, in a roll-to-roll manner, and performs a process of attaching the polarizing plate (process of attaching a parent material of the second polarizing plate) during the transportation. In the polarizing plate attaching apparatus 70, a first transmitting roller 71 that transmits the substrate is provided at one end, and a winding roller 72 that winds the substrate, which is subjected to the polarizing plate attaching process, is provided at the other end. The substrate is configured to be moved from a transmitting roller 71 side toward a winding roller 72 side. A second transmitting roller 73 that transmits a parent material of the second polarizing plate is provided on an upper side of the substrate. A pair of attaching rollers 74 and 75, which attach the parent material of the light-diffusing member and the parent material of the second polarizing plate to each other, is provided on a transportation route of the substrate.

First, as a long-sized substrate, triacetyl cellulose substrate having a thickness of 100 μm is prepared. Next, the light-shielding layers 40, which are formed from a black resin containing carbon as a light-shielding layer material, or a black ink, are transferred onto one surface of the substrate from the printing roller 53 using the printing apparatus 50 illustrated in FIG. 11A. The planar shape of the light-shielding layers 40 is an elliptical shape. The film thickness of the light-shielding layers 40 is set to 150 nm. According to this, the plurality of light-shielding layers 40 are formed on one surface of the substrate (step S1 illustrated in FIG. 10).

Each of the elliptical light-shielding layers 40 corresponds to a region (hollow portion 42) in which the light-diffusing section 41 is not formed in the subsequent step.

Arrangement of a gap (pitch) between the light-shielding layers 40 which are adjacent to each other may not be regular and may not be periodic. It is preferable that the gap (pitch) between the light-shielding layers 40 is smaller than a gap (pitch, for example, 150 μm) between pixels of the liquid crystal panel 2. According to this, at least one light-shielding layer 40 is formed in a pixel. Accordingly, for example, it is possible to realize a wide viewing angle during combination with a liquid crystal panel having a small pixel pitch which is used, for example, in mobile apparatuses and the like.

In addition, in this embodiment, the light-shielding layers 40 are formed by using a printing method, but there is no limitation thereto. In addition to the method, the light-shielding layers 40 can be formed in accordance with a photolithography method by using a black negative resist. In this case, in a case of using a photo-mask in which an opening pattern and a light-shielding pattern are inverted from each other, a light-absorbing positive resist can be used. Alternatively, the light-shielding layers 40 can be directly formed by using a deposition method, an ink jet method, and the like.

Next, a transparent negative resist, which is formed from an acrylic resin as a material of the light-diffusing section, is applied onto one surface of the substrate so as to cover the plurality of light-shielding layers 40 by using the application apparatus 55 and the slit coater 58 which are illustrated in FIG. 11B. According to this, a coated film (negative type photosensitive resin layer) having a film thickness of 20 μm is formed (step S2 illustrated in FIG. 10).

In addition, in this embodiment, the transparent negative resist is formed by using the slit coater, but there is no limitation thereto. In addition to this configuration, the transparent negative resist may be formed by using a spin coating method, a printing method, and the like.

Next, the coated film is irradiated with the diffused light Q1 by using the exposing apparatus 60 illustrated in FIG. 11C in a state in which the plurality of light-shielding layers 40 having an elliptical planar shape are set as a mask so as to perform exposure (step S3 illustrated in FIG. 10). At this time, an exposing apparatus, which uses mixed rays of i-rays having a wavelength of 365 nm, b-rays having a wavelength of 404 nm, and g-rays having a wavelength of 436 nm, is used. The amount of exposure is set to 500 mJ/cm$^2$.

Next, development of the coated film, which is formed from the transparent negative resist, is performed by using the developing apparatus 65 illustrated in FIG. 11D and the dedicated developing solution Q2, and post-baking is performed at 100° C., thereby forming the transparent resin layer 41 having a plurality of hollow portions 42 on one surface of the substrate (step S4 illustrated in FIG. 10).

In this embodiment, as illustrated in FIG. 11C, since the exposure is performed by using the diffused light, the transparent negative resist, which constitutes the coated film, is radially exposed to be spread from a region in which the light-shielding layers 40 are not formed toward an outer side. According to this, the hollow portions 42 having a forward tapered shape are formed. The light-diffusing section 41 has a reversed tapered shape. An inclination angle of the reflective surface 41c of the light-diffusing section 41 can be controlled to a certain extent in which the diffused light is diffused.

As the light Q1 that is used here, parallel light, diffused light, or light in which the intensity at a specific emission angle is different from intensity at another emission angle, that is, light having strength and weakness at a specific emission angle can be used. In the case of using the parallel light, the inclination angle of the reflective surface 41c of the light-diffusing section 41 becomes, for example, a single inclination angle of approximately 60° to 90°. In the case of using the diffused light, an inclined surface, in which the inclination angle continuously varies and a cross-sectional shape is a curve shape, is obtained. In the case of using the light having strength and weakness at a specific emission angle, an inclined surface having an inclined surface angle, which corresponds to the strength and weakness, is obtained. As described above, the inclination angle of the reflective surface 41c of the light-diffusing section 41 can be adjusted. According to this, it is possible to adjust the light diffusibility of the light-diffusing member 6 in order for a target visibility to be obtained.

In addition, as one unit that irradiates the substrate 39 with parallel light emitted from the exposing apparatus as the diffused light Q1, for example, a diffusing plate having a haze of approximately 50 is disposed on an optical path of light emitted from the exposing apparatus, and irradiation with light is performed through the diffusing plate.

Through the steps in FIGS. 11A to 11D, the parent material of the light-diffusing member 6 is completed. It is preferable that the total light transmittance of the light-diffusing member 6 is 90% or greater. When the total light transmittance is 90% or greater, it is possible to obtain sufficient transparency, and thus it is possible to sufficiently exhibit optical performance which is desirable for the light-diffusing member 6. The total light transmittance is regulated in accordance with JIS K7361-1.

Next, the parent material of the second polarizing plate 7 is attached to the light-incident end surface 41b of the light-diffusing section 41 in the parent material of the light-diffusing member 6 through the adhesive layer 43 (refer to FIG. 2) by using the polarizing plate attaching apparatus 70 illustrated in FIG. 11E (step S5 illustrated in FIG. 10).

In this step, the azimuth angle direction Vs in which the diffusibility of the light-diffusing member 6 is relatively strong, and the transmission axis P2 of the second polarizing plate 7 are made to be approximately parallel with each other.

In addition, an attached body of the parent material of the light-diffusing member 6 and the parent material of the second polarizing plate 7 which are attached to each other (hereinafter, simply referred to as an attached body) is cut-out in a plan view size of the liquid crystal display device 1. Through the above-described steps, the viewing angle enlarging member 3 according to this embodiment is completed.

In addition, in this embodiment, after attaching the parent material of the light-diffusing member 6 and the parent material of the second polarizing plate 7 to each other, this attached body is cut-out in the plan view size of the liquid crystal display device 1 to prepare the viewing angle enlarging member 3, but there is no limitation thereto. For example, after cutting the parent material of the light-diffusing member 6 and the parent material of the second polarizing plate 7 in the plan view size of the liquid crystal display device 1, respectively, the light-diffusing member 6 and the second polarizing plate 7 may be attached to each other to prepare the viewing angle enlarging member 3.

Finally, as illustrated in FIG. 2, in a state in which the substrate 39 faces a visual recognition side, and the second polarizing plate 7 faces the liquid crystal panel 2, the viewing angle enlarging member 3 that is completed is attached to the liquid crystal panel 2 by using an optical adhesive and the like.

Through the above-described steps, the liquid crystal display device 1 according to this embodiment is completed.

Here, operation of the viewing angle enlarging member 3 according to this embodiment will be described with reference to FIGS. 12 to 15.

First, with respect to light that is incident to the reflective surface 41c of the light-diffusing section 41 in a predetermined polarized state, a relationship between an incidence angle of light into the light-diffusing section 41 and a reflectance on the reflective surface 41c of the light-diffusing section 41 will be described.

Figure 12:
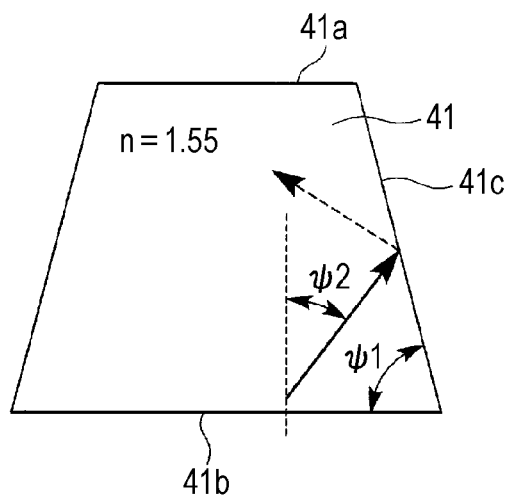
FIG. 12 is a view illustrating an inclination angle of a reflective surface of a light-diffusing section, and an incidence angle of light into the light-diffusing section.

Here, as an example, description will be made with respect to a case where an inclination angle ψ1 of the reflective surface 41c of the light-diffusing section 41 is set to 75°, and a refractive index n of the light-diffusing section 41 is set to 1.55 as illustrated in FIG. 12. In addition, in FIG. 12, light, which is incident to the light-diffusing section 41 at an incidence angle ψ2, is indicated by a solid line, and light, which is reflected from the reflective surface 41c of the light-diffusing section 41, is indicated by a broken line. In addition, the incidence angle ψ2 is an angle made by a normal line of the light-incident end surface 41b of the light-diffusing section 41 and a propagation direction of light that is incident to the light-diffusing section 41.

Figure 13:
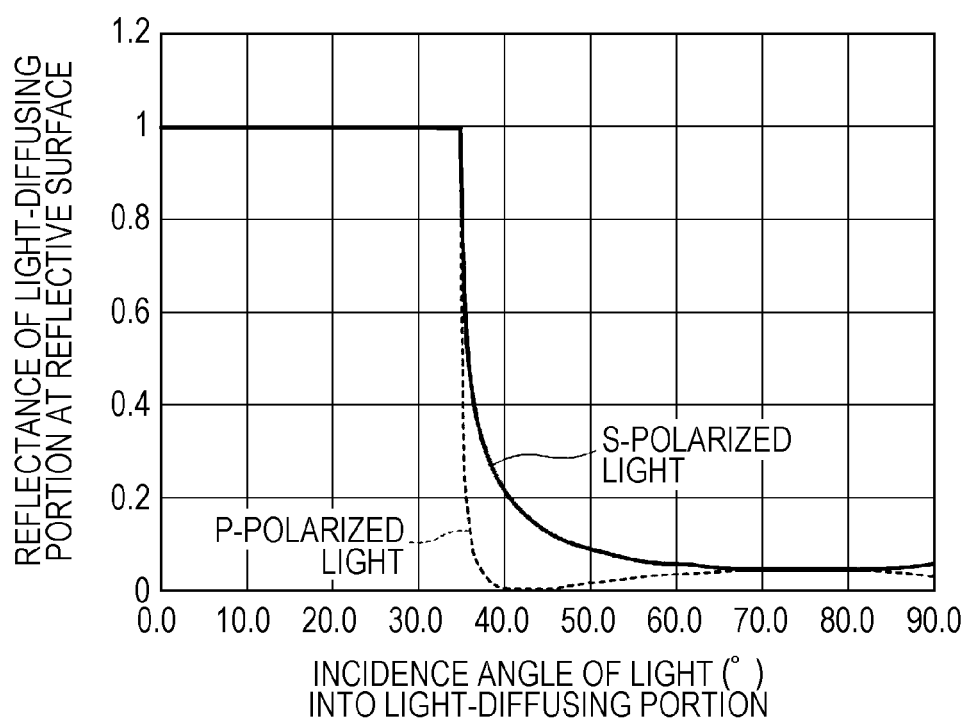
FIG. 13 is a view illustrating a relationship between an incidence angle of light into the light-diffusing section and a reflectance on the reflective surface of the light-diffusing section with respect to both P-polarized light and S-polarized light.

FIG. 13 is a view illustrating a relationship between an incidence angle of light into the light-diffusing section 41 and a reflectance on the reflective surface 41c of the light-diffusing section 41 with respect to both P-polarized light and S-polarized light in a case where the inclination angle ψ1 of the reflective surface 41c of the light-diffusing section 41 is set to 75° and the refractive index n of the light-diffusing section 41 is set to 1.55. In FIG. 13, the horizontal axis represents the incidence angle of light into the light-diffusing section 41, and the vertical axis represents the reflectance on the reflective surface 41c of the light-diffusing section 41.

Hereinafter, the incidence angle ψ2 of light into the light-diffusing section 41 may be simply referred to as an incidence angle ψ2. The reflectance on the reflective surface 41c of the light-diffusing section 41 may be simply referred to as a reflectance.

Here, a plane, which includes the minor axis (line parallel with the azimuth angle direction in which the diffusibility of the light-diffusing member 6 is strongest) of the light-shielding layer 40, and a normal line of the light-incident end surface 41b of the light-diffusing section 41, is set as an incident plane. The P-polarized light is polarized light having a polarized light component in which a vibrating direction of an electric field is parallel with the incident plane when light is incident to the reflective surface 41c of the light-diffusing section 41 at the incidence angle ψ2. The S-polarized light is polarized light having a polarized light component in which a vibrating direction of an electric field is perpendicular to the incident plane when light is incident to the reflective surface 41c of the light-diffusing section 41 at the incidence angle ψ2.

As illustrated in FIG. 13, in both the P-polarized light and the S-polarized light, in a range of the incidence angle ψ2 from 0° to 34°, the reflectance is 1. However, when the incidence angle ψ2 exceeds 34°, the reflectance rapidly decreases. This is because when the incidence angle ψ2 exceeds 35°, conditions under which total reflectance occurs are not satisfied in accordance with Snell's law.

In the S-polarized light, when the incidence angle ψ2 exceeds 36°, the incidence angle ψ2 gradually decreases up to 70°, and thus the reflectance gradually decreases to 0.05. In addition, in a range of the incidence angle ψ2 from 70° to 90°, the reflectance becomes approximately constant.

On the other hand, in the P-polarized light, in a range of the incidence angle ψ2 from 38° to 46°, the reflectance becomes 0. This is a characteristic peculiar to the P-polarized light. As described above, an angle at which the reflectance becomes 0 in the P-polarized light is referred to as a Brewster angle.

In addition, in the P-polarized light, when the incidence angle ψ2 becomes 70°, the reflectance increases up to 0.05. In addition, in a range of the incidence angle ψ2 from 70° to 90°, the reflectance becomes approximately constant.

Figure 14:
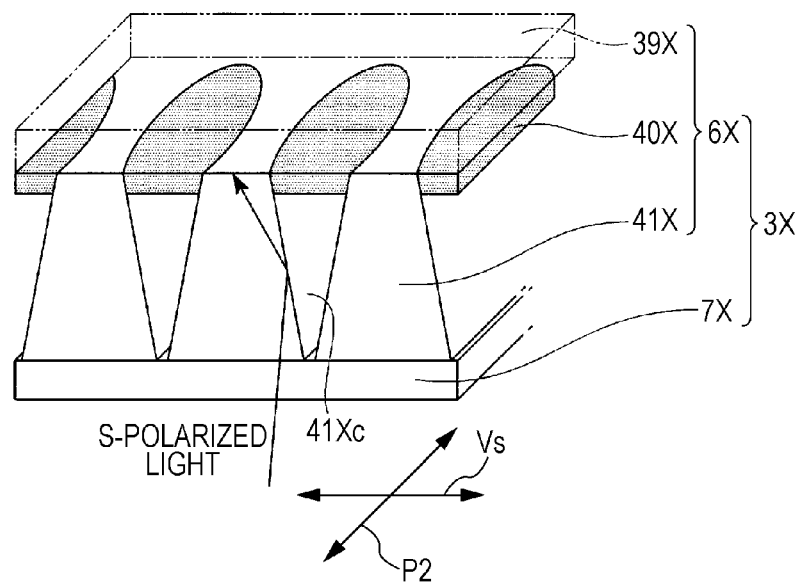
FIG. 14 is a view illustrating operation of a light-diffusing member having a polarizing plate according to a comparative example.

FIG. 14 is a view illustrating operation of a viewing angle enlarging member 3X according to a comparative example.

As illustrated in FIG. 14, in the viewing angle enlarging member 3X according to the comparative example, the azimuth angle direction Vs in which the diffusibility of a light-diffusing member 6X is relatively strong, and the transmission axis P2 of the second polarizing plate 7 are approximately perpendicular to each other. In this case, the S-polarized light tends to be incident to a reflective surface 41Xc of a light-diffusing section 41X in a relatively large amount in a minor-axis direction of a light-shielding layer 40X. In a case where the S-polarized light is incident to the reflective surface 41Xc of the light-diffusing section 41X, the reflectance does not become 0 similar to P-polarized light to be described later. According to this, among light beams which are incident to the light-diffusing section 41X, all light beams, which head for the reflective surface 41Xc, are reflected from the reflective surface 41Xc. The light beams, which are reflected from the reflective surface 41Xc, are emitted to the outside without being absorbed by the light-shielding layer 40.

Figure 15:
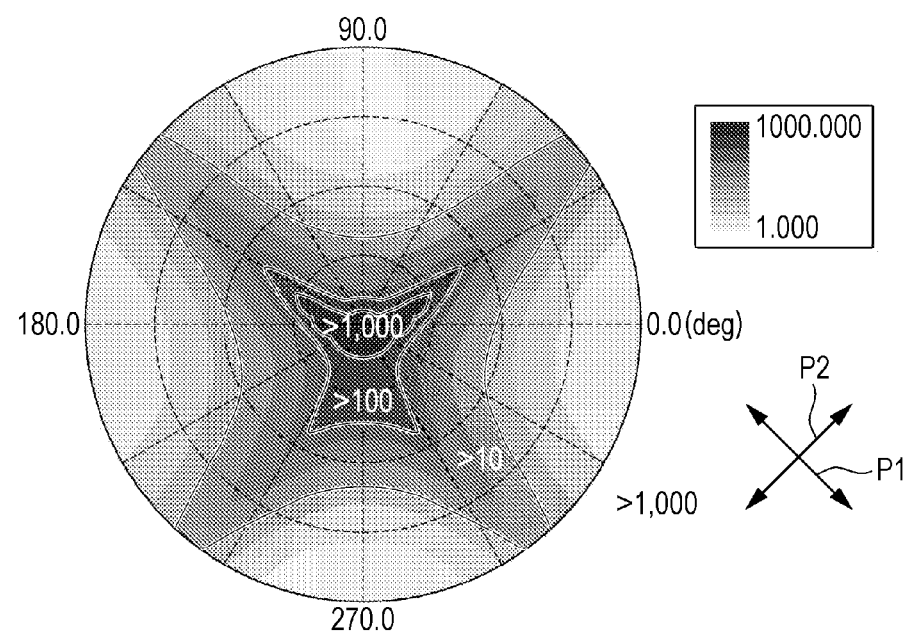
FIG. 15 is a view illustrating an equivalent contrast curve that illustrates contrast viewing angle characteristics during white display in a liquid crystal panel.

FIG. 15 is a view illustrating an equivalent contrast curve that illustrates contrast viewing angle characteristics during white display in the liquid crystal panel 2 according to this embodiment. When defining the azimuth angle direction illustrated in FIG. 8, the equivalent contrast curve becomes identical to that illustrated FIG. 15. In three equivalent contrast curves, a contrast ratio increases from an outer side to an inner side.

In addition, the contrast ratio is a luminance value of white display/a luminance value of black display in a display image. The larger the contrast ratio is, the better the visibility of the display image is.

The contrast ratio of the three equivalent contrast curves is set as follows. In the order from an outer side, a first contrast ratio is set to 10, a second contrast ratio is set to 100, and a third contrast ratio is set to 1000. All of the three contrast curves have a rotationally asymmetrical shape. The respective equivalent contrast curves are biased in a direction in which the azimuth angle φ is 45° or 225°, and in a direction in which the azimuth angle φ is 135° or 315°. That is, a luminance peak deviates in the direction of the transmission axis P1 of the first polarizing plate 5 and in the direction of the transmission axis P2 of the second polarizing plate 7. In addition, in the liquid crystal panel 2, the larger the polar angle, the lower the contrast ratio is. That is, the larger an incidence angle to the light-diffusing section is, the lower the contrast ratio is.

As described above, in light beams which head for the reflective surface 41Xc among light beams which are incident to the light-diffusing section 41X, light beams (light beams emitted from the liquid crystal panel 2 at a large polar angle), which are incident at an incidence angle larger than a total reflection angle, have a low contrast ratio, and as a result, the light beams deteriorate display quality of the liquid crystal display device overall.

Figure 16:
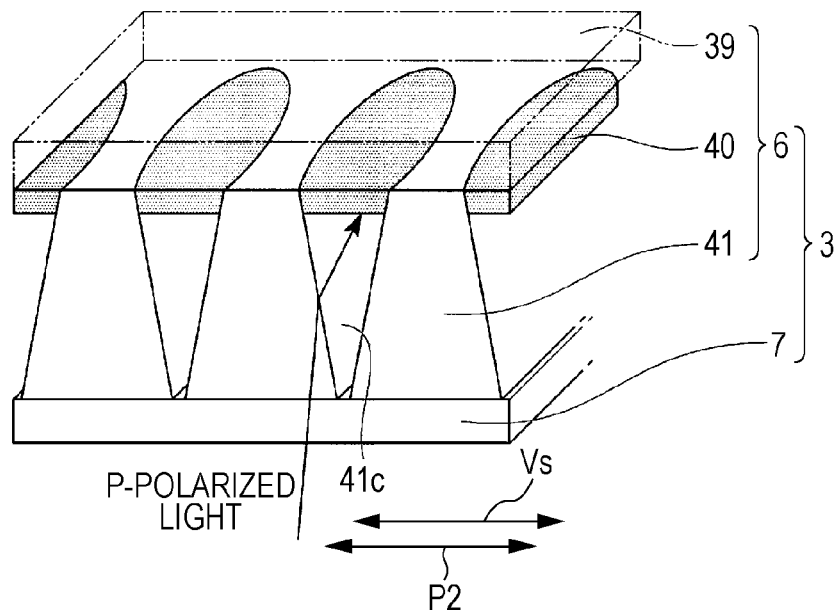
FIG. 16 is a view illustrating operation of the light-diffusing member having a polarizing plate according to the first embodiment.

On the other hand, FIG. 16 is a view illustrating operation of the viewing angle enlarging member 3 according to this embodiment.

As illustrated in FIG. 16, in the viewing angle enlarging member 3 according to this embodiment, the azimuth angle direction Vs in which the diffusibility of the light-diffusing member 6 is relatively strong, and the transmission axis P2 of the second polarizing plate 7 approximately match each other. In this case, the P-polarized light tends to be incident to the reflective surface 41c of the light-diffusing section 41 in the minor axis direction of the light-shielding layer 40 in a relatively large amount. When the P-polarized light is incident to the reflective surface 41c of the light-diffusing section 41, as described above, the reflectance at the Brewster angle becomes 0. According to this, among light beams which are incident to the light-diffusing section 41, light beams (light beams having a low contrast ratio) which are incident to the reflective surface 41c at an angle higher than the total reflection angle are not reflected from the reflective surface 41c and are absorbed by the light-shielding layer 40. As a result, the contrast ratio is improved, and thus it is possible to improve the display quality of the liquid crystal display device 1.

In addition, according to this embodiment, it is possible to provide a method of producing the viewing angle enlarging member 3 which is capable of improving light usage efficiency. In addition, it is possible to provide the liquid crystal display device 1 which is provided with the viewing angle enlarging member 3 and is excellent in display quality.

In general, in a case where regular patterns such as a strip and a lattice are overlapped with each other, when periods of respective patterns slightly deviate from each other, it is known that an interference fringe pattern (moire) is visually recognized. For example, when assuming that a light-diffusing member in which a plurality of light-diffusing sections are arranged in a matrix shape, and a liquid crystal panel in which a plurality of pixels are arranged in a matrix shape are overlapped with each other, there is a concern that the moire occurs between a periodic pattern due to the light-diffusing sections of the light-diffusing member and a periodic pattern due to the pixels of the liquid crystal panel, and thus the moire may deteriorate the display quality.

In contrast, in the liquid crystal display device 1 according to this embodiment, the plurality of light-shielding layers 40 are randomly arranged in a plan view. The light-diffusing section 41 is formed in a region other than a region in which the light-shielding layers 40 are formed. According to this, moire due to interference with the regular arrangement of the pixels of the liquid crystal panel 2 does not occur, and thus it is possible to maintain display quality.

In this embodiment, the plurality of light-shielding layers 40 are randomly arranged, but it is not necessary for the arrangement of the plurality of light-shielding layers 40 to be random. When the arrangement of the plurality of light-shielding layers 40 is non-periodic, it is possible to suppress occurrence of the moire. In addition, in a case where the occurrence of some moires is permitted in accordance with a usage and a situation, the plurality of light-shielding layers 40 may be periodically arranged.

First Modification Example of First Embodiment

Figure 17:
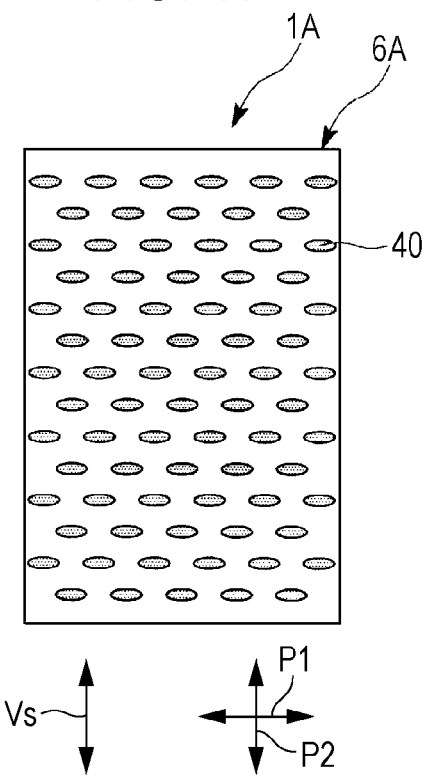
FIG. 17 is a view illustrating a disposition relationship between an azimuth angle direction in which diffusibility of a light-diffusing member is relatively strong, and a transmission axis of a polarizing plate in a front elevation view of a liquid crystal display device according to a first modification example of the first embodiment.

FIG. 17 is a view illustrating a disposition relationship between the azimuth angle direction Vs in which the diffusibility of the light-diffusing member 6A is relatively strong, and the transmission axis of the polarizing plate (the transmission axis P1 of the first polarizing plate 5, the transmission axis P2 of the second polarizing plate 7) in the front elevation view of a liquid crystal display device 1A according to a first modification example of the first embodiment.

In the first embodiment, the front elevation shape of the liquid crystal display device 1 is a rectangular shape that is elongated in a right and left direction (horizontally elongated). In contrast, in this modification example, the front elevation shape of the liquid crystal display device 1A is a rectangular shape that is elongated in an upper and lower direction (vertically elongated).

In this modification example, similar to the first embodiment, the azimuth angle direction Vs in which the diffusibility of the light-diffusing member 6 is relatively strong is a direction in which the azimuth angle $\phi$ is 90° or 270°. According to this, in the liquid crystal display device 1A, diffusion intensity in an upper and lower direction increases, and thus visibility in the upper and lower direction is further improved.

In addition, in this modification example, similar to the first embodiment, the azimuth angle direction Vs in which the diffusibility of the light-diffusing member 6A is relatively strong, and the transmission axis P2 of the second polarizing plate 7 are set to be approximately parallel with each other (to match each other).

Even in the viewing angle enlarging member according to this modification example, it is possible to improve the contrast ratio.

In addition, it is possible to provide the liquid crystal display device 1A which is provided with the viewing angle enlarging member, and is excellent in the display quality.

Second Modification Example of First Embodiment

Figure 18:
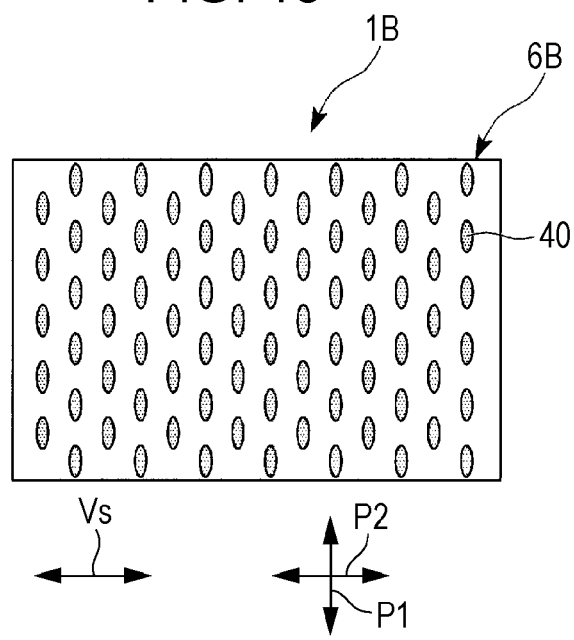
FIG. 18 is a view illustrating a disposition relationship between an azimuth angle direction in which diffusibility of a light-diffusing member is relatively strong, and a transmission axis of a polarizing plate in a front elevation view of a liquid crystal display device according to a second modification example of the first embodiment.

FIG. 18 is a view illustrating a disposition relationship between the azimuth angle direction Vs in which diffusibility of a light-diffusing member 6B is relatively strong, and the transmission axis of the polarizing plate (the transmission axis P1 of the first polarizing plate 5, the transmission axis P2 of the second polarizing plate 7) in a front elevation view of a liquid crystal display device 1B according to a second modification example of the first embodiment.

In the first embodiment, the azimuth angle direction Vs in which the diffusibility of the light-diffusing member 6 is relatively strong is a direction in which the azimuth angle $\phi$ is 90° or 270°.

In contrast, in this modification example, the azimuth angle direction Vs in which the diffusibility of the light-diffusing member 6B is relatively strong is a direction in which the azimuth angle $\phi$ is 0° or 180°. According to this, in the liquid crystal display device 1B, diffusion intensity in a right and left direction increases, and thus visibility in the right and left direction is further improved.

In this modification example, similar to the first embodiment, the front elevation shape of the liquid crystal display device 1B is a rectangular shape that is elongated in the right and left direction (horizontally elongated). In addition, the azimuth angle direction Vs in which the diffusibility of the light-diffusing member 6B is relatively strong, and the transmission axis P2 of the second polarizing plate 7 are made to be approximately parallel with each other (to match each other).

Even in the viewing angle enlarging member according to this modification example, it is possible to improve the contrast ratio.

In addition, it is possible to provide the liquid crystal display device 1B which is provided with the viewing angle enlarging member, and is excellent in the display quality.

Third Modification Example of First Embodiment

Figure 19:
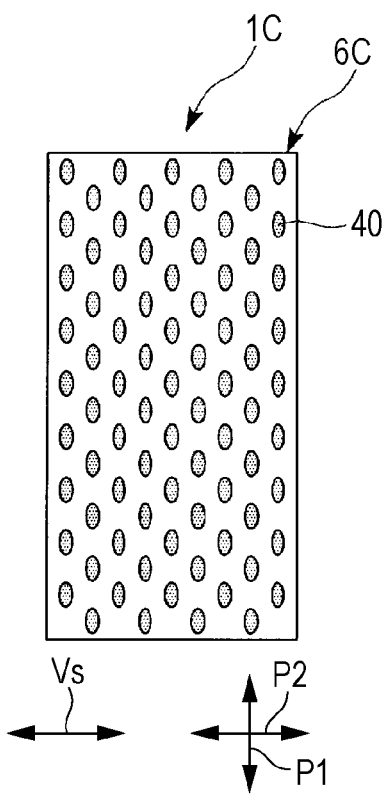
FIG. 19 is a view illustrating a disposition relationship between an azimuth angle direction in which diffusibility of a light-diffusing member is relatively strong, and a transmission axis of a polarizing plate in a front elevation view of a liquid crystal display device according to a third modification example of the first embodiment.

FIG. 19 is a view illustrating a disposition relationship between the azimuth angle direction Vs in which diffusibility of a light-diffusing member 6C is relatively strong, and the transmission axis of the polarizing plate (the transmission axis P1 of the first polarizing plate 5, the transmission axis P2 of the second polarizing plate 7) in a front elevation view of a liquid crystal display device 1C according to a third modification example of the first embodiment.

In the first embodiment, the front elevation shape of the liquid crystal display device 1 is a rectangular shape that is elongated in a right and left direction (horizontally elongated). In addition, the azimuth angle direction Vs in which the diffusibility of the light-diffusing member 6 is relatively strong is a direction in which the azimuth angle φ is 90° or 270°.

In contrast, in this modification example, the front elevation shape of the liquid crystal display device 1C is a rectangular shape that is elongated in an upper and lower direction (vertically elongated).

In addition, the azimuth angle direction Vs in which the diffusibility of the light-diffusing member 6C is relatively strong is a direction in which the azimuth angle φ is 0° or 180°. According to this, in the liquid crystal display device 1C, diffusion intensity in the right and left direction increases, and thus visibility in the right and left direction is further improved.

In this modification example, similar to the first embodiment, the azimuth angle direction Vs in which the diffusibility of the light-diffusing member 6C is relatively strong, and the transmission axis P2 of the second polarizing plate 7 are made to be approximately parallel with each other (to match each other).

Even in the viewing angle enlarging member according to this modification example, it is possible to improve the contrast ratio.

In addition, it is possible to provide the liquid crystal display device 1C which is provided with the viewing angle enlarging member, and is excellent in the display quality.

Second Embodiment

Hereinafter, a second embodiment of the invention will be described with reference to FIG. 20.

The basic configuration of the liquid crystal display device of this embodiment is the same as in the first embodiment, and the second embodiment is different from the first embodiment in that a plurality of light-diffusing sections 141 are arranged in the light-diffusing member 106. According to this, in this embodiment, description of the basic configuration of the liquid crystal display device will be omitted, and the light-diffusing member 106 will be described.

Figure 20:
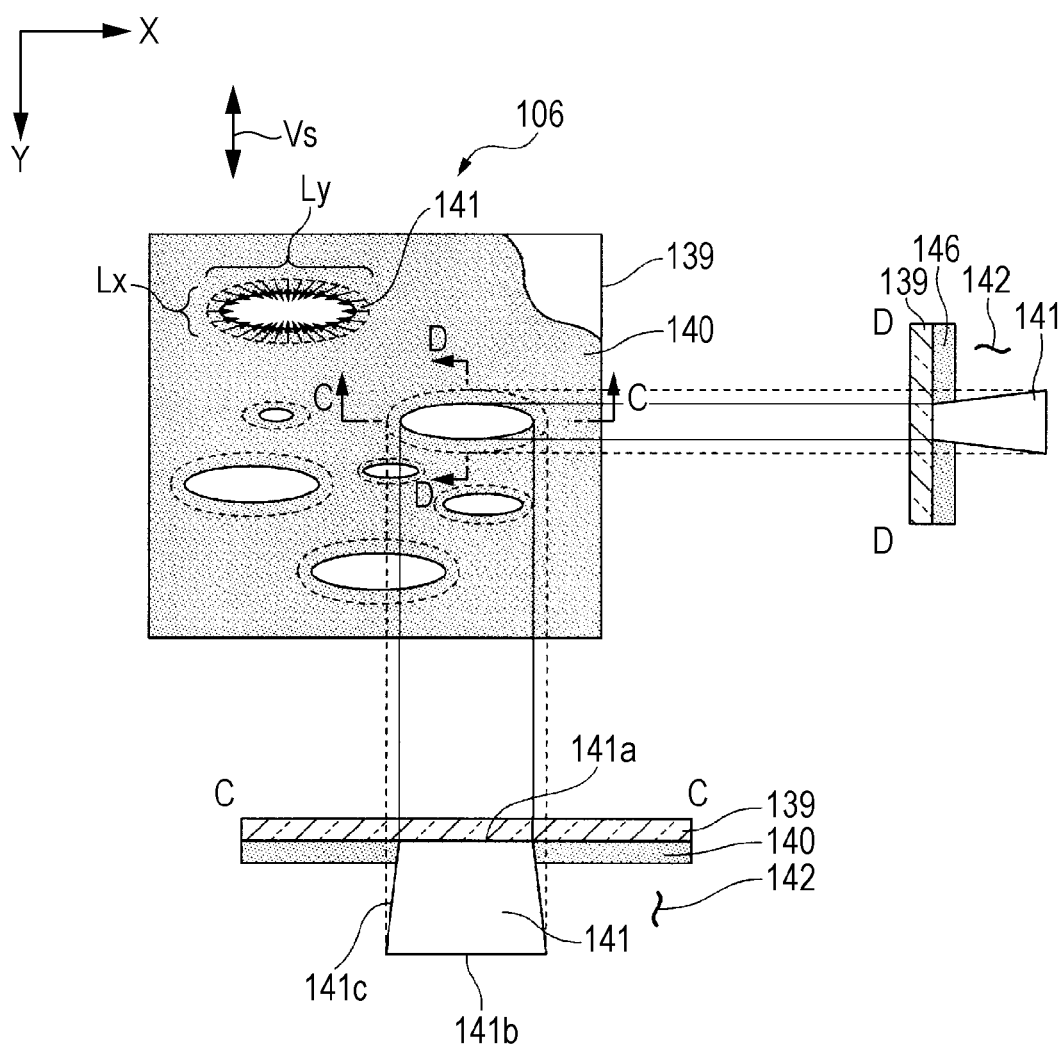
FIG. 20 is a plan view of a light-diffusing member according to a second embodiment.

FIG. 20 is a schematic view of the light-diffusing member 106. In FIG. 20, a left-upper section represents a plan view of the light-diffusing member 106. A left-lower section represents a cross-sectional view taken along line C-C in the plan view on the left-upper section. A right-upper section represents a cross-sectional view taken along line D-D in the plan view on the left-upper section.

In the first embodiment, the plurality of light-shielding layers 40 which are formed on one surface of the substrate 39, and the light-diffusing section 41 that is formed in a region on the one surface of the substrate 39 other than a region in which the light-shielding layers 40 are formed are provided. In addition, the plurality of light-shielding layers 40 are arranged on the one surface of the substrate 39 in a scattered manner, and the light-diffusing section 41 is continuously formed in the region other than the region in which the light-shielding layers 40 are formed.

In contrast, as illustrated on the left-upper section of FIG. 20, the light-diffusing member 106 of this embodiment includes a plurality of light-diffusing sections 141 which are formed on one surface of a substrate 139, and a light-shielding layer 140 that is formed in a region on the one surface of the substrate 139 other than a region in which the light-diffusing sections 141 are formed. In addition, the plurality of light-diffusing sections 141 are arranged on the one surface of the substrate 139 in a scattered manner, and the light-shielding layer 140 is continuously formed in the region other than the region in which the light-diffusing sections 141 are formed.

The plurality of light-diffusing sections 141 are randomly (non-periodically) arranged when viewed from a normal direction of a main surface of the substrate 139. Accordingly, a pitch of the light-diffusing sections 141 which are adjacent to each other is not constant.

However, an average pitch obtained by averaging pitches between the light-diffusing sections 141 which are adjacent to each other is set to 25 v.

It is desirable for an average gap between the light-diffusing sections 141 to be smaller than a gap (pitch) between pixels of the liquid crystal panel 2. According to this, at least one light-diffusing section 141 is formed in a pixel, and thus, for example, it is possible to realize a wide viewing angle during combination with a liquid crystal panel having a small pixel pitch which is used, for example, in a mobile apparatuses and the like.

In the light-shielding layer 140, a plurality of openings are randomly (non-periodically) formed on the substrate 139. In this embodiment, the plurality of light-diffusing section 141 are provided in correspondence with positions at which the openings of the light-shielding layer 140 are formed.

As illustrated on the left-lower section and the right-upper section of FIG. 20, the light-diffusing sections 141 have a truncated elliptical cone shape in which when being cut-out along a plane parallel with the one surface of the substrate 139, a cross-sectional area (an elliptical shape) is smaller on a substrate 139 side, and the cross-sectional area gradually decreases as it is distant from the substrate 139. In two opposite surfaces of each of the light-diffusing sections 141, a surface on a small area side (surface that is in contact with the substrate 139) becomes a light-emitting end surface 141a, and a surface on a large area side (surface that is opposite to the substrate 139) becomes a light-incident end surface 141b.

A portion, which corresponds to a lower side of the light-shielding layer 140, becomes a hollow portion 142. Air exists in the hollow portion 142. The light-diffusing member 106 has a continuous hollow portion 142 in which air exists.

In this embodiment, since air exists in a space between the light-diffusing sections 141 which are adjacent to each other, when assuming that the light-diffusing sections 41 are formed from, for example, an acrylic resin, a reflective surface 141c of the light-diffusing section 141 becomes an interface between the acrylic resin and air.

Accordingly, in accordance with Snell's law, an incidence angle range in which light is totally reflected from the reflective surface 141c of the light-diffusing section 141 is wide. As a result, light loss is further suppressed, and thus high luminance can be obtained.

In addition, in this embodiment, the periphery of the light-diffusing sections 141 may be set to a low refractive index state for realization of total reflection of light, or may be set to a state of being filled with an inert gas such as nitrogen instead of air. Alternatively, the space between the light-diffusing sections 141 may be set to a vacuum state or a decompressed state in comparison to the air.

As illustrated on the left-upper section of FIG. 20, a planar shape of the light-diffusing sections 141 when viewed from a normal direction of the substrate 139 is an elongated elliptical shape. The light-diffusing section 141 has a major axis and a minor axis.

The major axis direction of the plurality of light-diffusing sections 141 is approximately aligned to the X-direction. The minor axis direction of the plurality of the light-diffusing sections 141 is approximately aligned to the Y-direction. According to this, when considering a direction of the reflective surface 141c of the light-diffusing section 141, in the reflective surface 141c of the light-diffusing sections 141, a ratio of the reflective surface 141c along the X-direction is larger than a ratio of the reflective surface 141c along the Y-direction. According to this, the amount of light Ly that is reflected from the reflective surface 141c along the X-direction and is diffused to the Y-direction is greater than the amount of light Lx that is reflected from the reflective surface 141c along the Y-direction and is diffused to the X-direction.

Accordingly, an azimuth angle direction Vs in which diffusibility of the light-diffusing member 106 is strongest becomes the Y-direction that is the minor axis direction of the light-diffusing sections 141. A polar angle direction is set in an arbitrary manner.

However, in a case where the planar shape of the light-diffusing section is a circular shape, in the reflective surface of the light-diffusing sections, a ratio of a reflective surface along the X-direction is the same as a ratio of a reflective surface along the Y-direction. According to this, light that is reflected from the reflective surface along the X-direction and is diffused to the Y-direction becomes the same as light that is reflected from the reflective surface along the Y-direction and is diffused to the X-direction. That is, when viewed from the normal direction of the substrate, light is reflected from the reflective surface in an isotropic manner. Accordingly, the azimuth angle direction, in which the diffusibility of the light-diffusing member is strongest, is not present.

In this embodiment, similar to the first embodiment, the azimuth angle direction Vs in which the diffusibility of the light-diffusing member 106 is relatively strong, and the transmission axis P2 of the second polarizing plate 7 is made to be approximately parallel with each other (to match each other).

Next, steps of producing the viewing angle enlarging member according to this embodiment will be described.

The basic steps of the method of producing the viewing angle enlarging member according to this embodiment is the same as in the first embodiment except that the light-shielding layer formed on one surface of the substrate in a step of forming the light-shielding layer has a plurality of openings. Accordingly, the viewing angle enlarging member according to this embodiment is subjected to various processes by processing apparatuses which are common to the processing apparatuses described in the first embodiment. According to this, the same reference numerals are given to processing apparatuses which are common to the processing apparatuses described in the first embodiment, and detailed description of a producing method that is common to the producing method described in the first embodiment will be omitted.

Figure 21A:
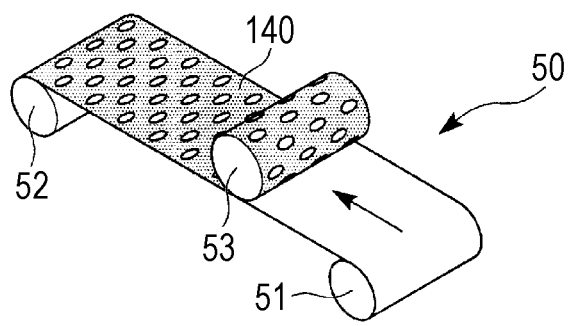
FIG. 21A is a perspective view illustrating a step of producing the light-diffusing member having a polarizing plate according to the second embodiment.

First, the light-shielding layers 140, which is formed from the same formation material as that of the above-described light-shielding layer 40 and has a plurality of openings, is transferred onto one surface of the substrate from a printing roller 53 by using a printing apparatus 50 illustrated in FIG. 21A. A planar shape of the openings in the light-shielding layer 140 is an elliptical shape. The film thickness of the light-shielding layer 140 is set to 150 nm. According to this, the light-shielding layer 140 having the plurality of openings is formed on the one surface of the substrate (step S1 illustrated in FIG. 10).

Each of elliptical openings corresponds to a region in which each of the light-diffusing sections 141 is formed in the subsequent step. It is desirable for a gap (pitch) between the openings to be smaller than a gap (pitch, for example, 150 μm) of the pixels of the liquid crystal panel 2. Accordingly, at least one light-diffusing section 141 is formed in a pixel. According to this, it is possible to realize a wide viewing angle during combination with a liquid crystal panel having a small pixel pitch which is used, for example, in a mobile apparatuses and the like.

In addition, in this embodiment, the light-shielding layer 140 having the plurality of openings is formed by using a printing method, but there is no limitation thereto. In addition to the method, the light-shielding layer 140 can be formed in accordance with a photolithography method using a black negative resist. In this case, in a case of using a photo-mask in which an opening pattern and a light-shielding pattern are inverted from each other, a light-absorbing positive resist can be used. Alternatively, the light-shielding layer 140 can be directly formed by using a deposition method, an ink jet method, and the like.

Figure 21B:
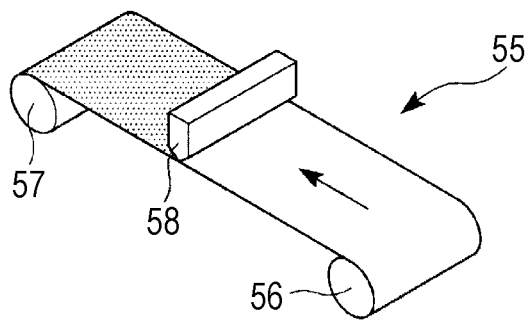
FIG. 21B is a perspective view illustrating a step of producing the light-diffusing member having a polarizing plate according to the second embodiment.

Next, a transparent negative resist, which is formed from an acrylic resin as a material of the light-diffusing sections, is applied onto one surface of the substrate so as to cover the plurality of openings by using the application apparatus 55 and a slit coater 58 which are illustrated in FIG. 21B. According to this, a coated film having a film thickness of 20 μm is formed (step S2 illustrated in FIG. 10).

In addition, in this embodiment, the transparent negative resist is formed by using the slit coater, but there is no limitation thereto. In addition this configuration, the transparent negative resist may be formed by using a spin coating method, a printing method, and the like.

Figure 21C:
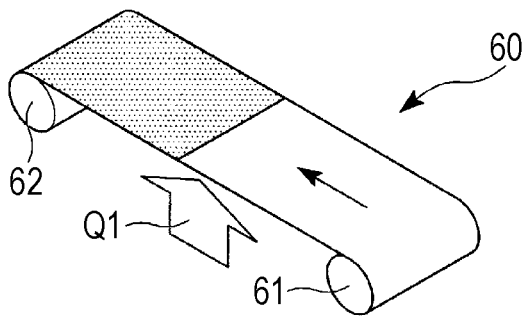
FIG. 21C is a perspective view illustrating a step of producing the light-diffusing member having a polarizing plate according to the second embodiment.

Next, the coated film is irradiated with the diffused light Q1 by using an exposing apparatus 60 illustrated in FIG. 21C in a state in which the light-shielding layer 140 having the plurality of openings is set as a mask so as to perform exposure (step S3 illustrated in FIG. 10).

At this time, an exposing apparatus, which uses mixed rays of i-rays having a wavelength of 365 nm, h-rays having a wavelength of 404 nm, and g-rays having a wavelength of 436 nm, is used. An amount of exposure is set to 500 mJ/cm$^2$.

Figure 21D:
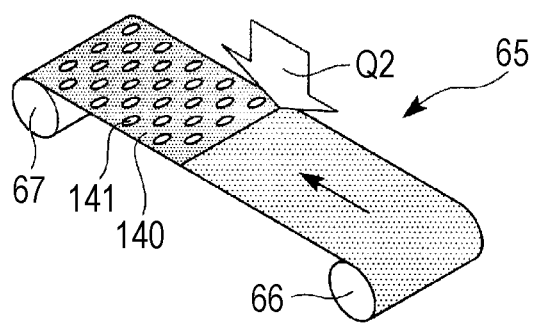
FIG. 21D is a perspective view illustrating a step of producing the light-diffusing member having a polarizing plate according to the second embodiment.

Next, development of the coated film, which is formed from the transparent negative resist, is performed by using an developing apparatus 65 illustrated in FIG. 21D and a dedicated developing solution Q2, and post-baking is performed at 100° C., thereby forming the transparent resin layer 141 having the hollow portions 142 on one surface of the substrate (step S4 illustrated in FIG. 10).

In this embodiment, as illustrated in FIG. 21C, since the exposure is performed by using the diffused light Q1, the transparent negative resist, which constitutes the coated film, is radially exposed to be spread from a region (opening) in which the light-shielding layer 140 is not formed toward an outer side. According to this, the hollow portions 142 having a forward tapered shape are formed. The light-diffusing section 141 has a reversed tapered shape. An inclination angle of the reflective surface 141c of the light-diffusing section 141 can be controlled to a certain extent in which the diffused light is diffused.

Through the above-described steps illustrated in FIGS. 21A to 21D, a parent material of the light-diffusing member 106 is completed.

Figure 21E:
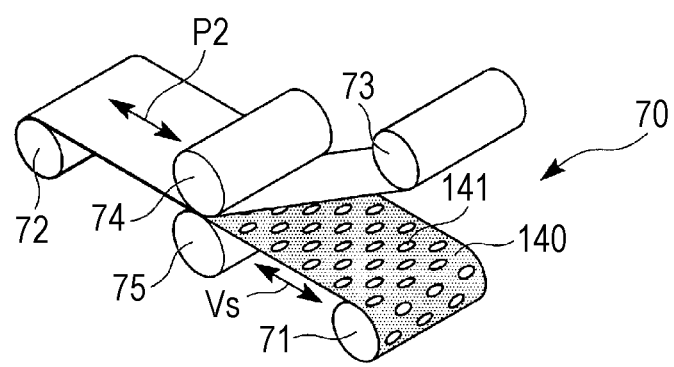
FIG. 21E is a perspective view illustrating a step of producing the light-diffusing member having a polarizing plate according to the second embodiment.

Next, the parent material of the second polarizing plate 7 is attached to the light-incident end surface 141b of the light-diffusing section 141 in the parent material of the light-diffusing member 106 through the adhesive layer by using a polarizing plate attaching apparatus 70 illustrated in FIG. 21E (step S5 illustrated in FIG. 10).

In this step, the azimuth angle direction Vs in which the diffusibility of the light-diffusing member 106 is relatively strong, and the transmission axis P2 of the second polarizing plate 7 are made to be approximately parallel with each other (to match each other).

In addition, an attached body of the parent material of the light-diffusing member 106 and the parent material of the second polarizing plate 7 which are attached to each other (hereinafter, simply referred to as an attached body) is cut-out in a plan view size of the liquid crystal display device 1. Through the above-described steps, the viewing angle enlarging member according to this embodiment is completed.

Finally, in a state in which the substrate 139 faces a visual recognition side, and the second polarizing plate 7 faces the liquid crystal panel 2, the viewing angle enlarging member that is completed is attached to the liquid crystal panel 2 by using an optical adhesive and the like.

Through the above-described steps, the liquid crystal display device according to this embodiment is completed.

Even in the viewing angle enlarging member provided with the light-diffusing member 106 according to this embodiment, it is possible to improve the contrast ratio. In addition, it is possible to provide a liquid crystal display device which is provided with the viewing angle enlarging member and is excellent in the display quality.

First Modification Example of Second Embodiment

Figure 22:
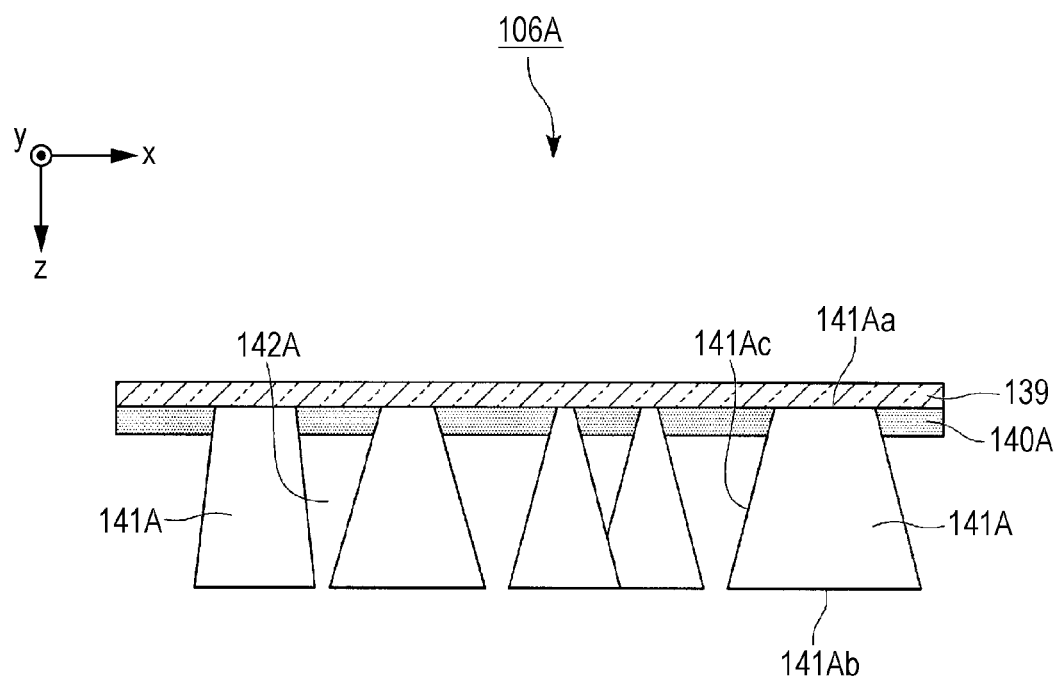
FIG. 22 is a cross-sectional view of a light-diffusing member according to a first modification example of the second embodiment.

FIG. 22 is a cross-sectional view of a light-diffusing member 106A according to a first modification example of the second embodiment.

In the second embodiment, inclination angles of reflective surfaces of the plurality of the light-diffusing sections 141 are the same as each other. In contrast, in the light-diffusing member 106A of this modification example, as illustrated in FIG. 22, inclination angles of reflective surfaces 141Ac of a plurality of light-diffusing sections 141A are different from each other. That is, in the entirety of the plurality of light-diffusing sections 141A, the light-emitting end surfaces 141Aa of the plurality of light-diffusing sections 141A have a plurality of kinds of dimensions, and the reflective surface 141Ac of the plurality of light-diffusing sections 141A have a plurality of kinds of inclination angles. The inclination angles of the reflective surfaces 141Ac of the plurality of light-diffusing sections 141A are different from each other, and thus dimensions of light-incident end surfaces 141Ab are different from each other. The other configurations are the same as in the second embodiment.

Even in the viewing angle enlarging member provided with the light-diffusing member 106A according to this modification example, it is possible to improve the contrast ratio. In addition, it is possible to provide a liquid crystal display device which is provided with the viewing angle enlarging member and is excellent in the display quality.

Second Modification Example of Second Embodiment

Figure 23A:
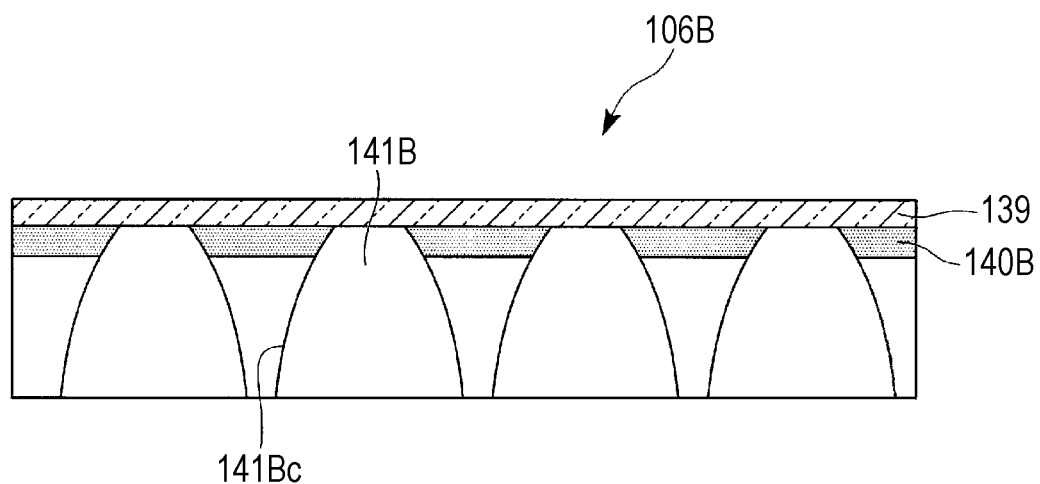
FIG. 23A is a cross-sectional view of a light-diffusing member according to a second modification example of the second embodiment.
Figure 23B:
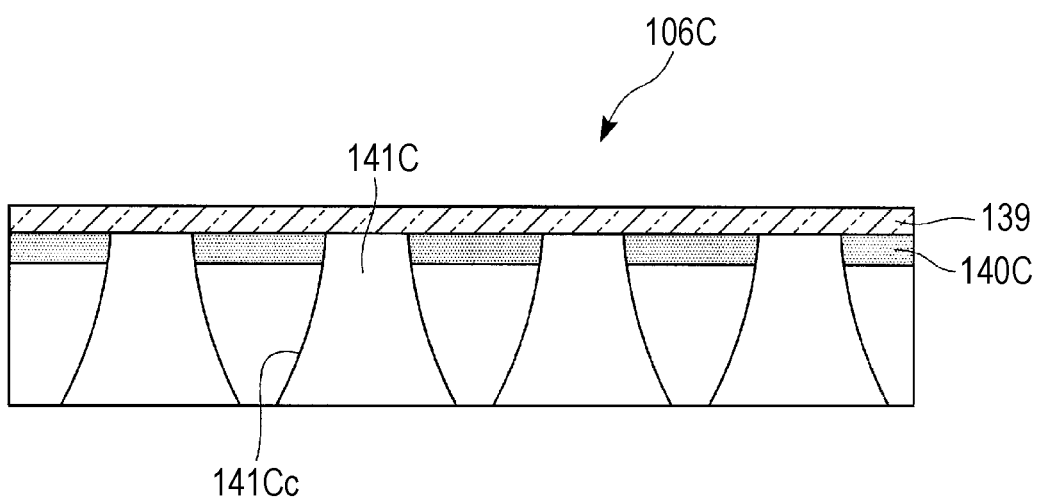
FIG. 23B is a cross-sectional view of the light-diffusing member according to the second modification example of the second embodiment.

FIGS. 23A and 23B are cross-sectional views of light-diffusing members 106B and 106C according to a second modification example of the second embodiment.

In the second embodiment, the inclination angle of the reflective surface 141c of each of the light-diffusing sections 141 is constant.

In contrast, inclination angles of respective reflective surfaces 141Bc and 141Cc of light-diffusing sections 141B and 141C of this modification example are different depending on location as illustrated in FIGS. 23A and 23B. Specifically, in each of the reflective surfaces 141Bc and 141Cc of the light-diffusing sections 141B and 141C, the inclination angle continuously varies.

In the light-diffusing member 106B illustrated in FIG. 23A, the reflective surface 141Bc of the light-diffusing section 141B is outwardly curved.

In the light-diffusing member 106C illustrated in FIG. 23B, the reflective surface 141Cc of the light-diffusing section 141C is inwardly curved.

According to the configuration of this modification example, it is possible to increase light diffusibility in comparison to the configuration of the second embodiment.

Third Modification Example of Second Embodiment

Figure 24A:
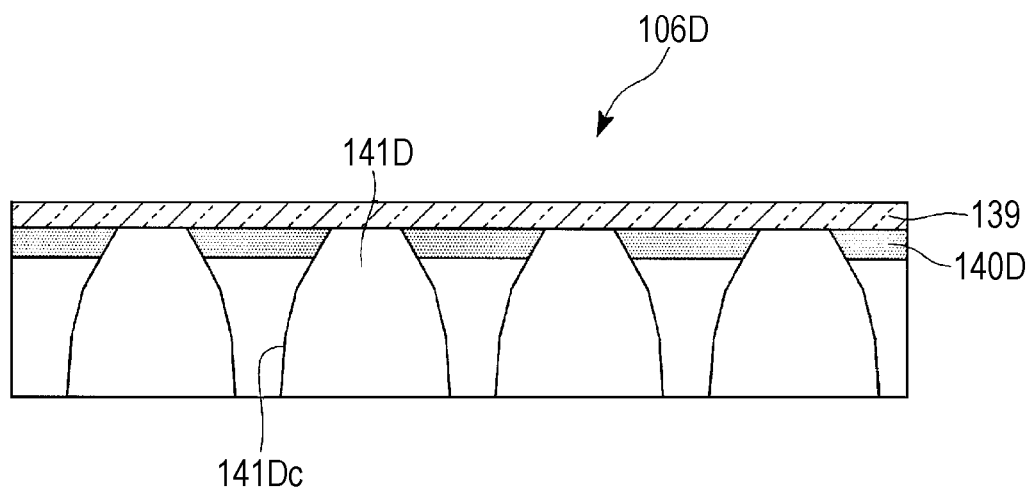
FIG. 24A is a cross-sectional view of a light-diffusing member according to a third modification example of the second embodiment.
Figure 24B:
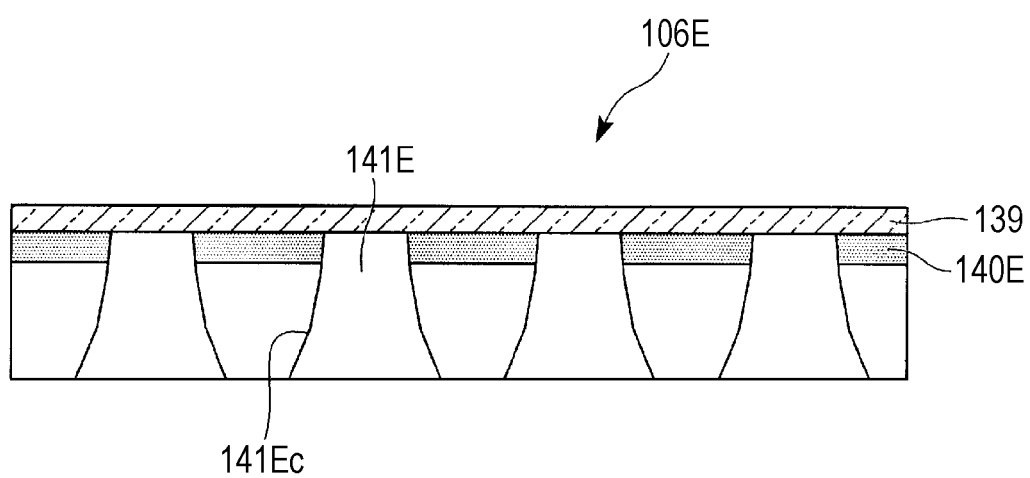
FIG. 24B is a cross-sectional view of the light-diffusing member according to the third modification example of the second embodiment.

FIGS. 24A and 24B are cross-sectional views of light-diffusing members 106D and 106E according to a third modification example of the second embodiment.

In the second embodiment, the inclination angle of the reflective surface 141c of each of the light-diffusing sections 141 is constant.

In contrast, inclination angles of respective reflective surfaces 141Dc and 141Ec of light-diffusing sections 141D and 141E of this modification example are different depending on location as illustrated in FIGS. 24A and 24B. Specifically, each of the reflective surfaces 141Dc and 141Ec of the light-diffusing sections 141D and 141E of this modification example is formed with a plurality of different inclination angles (inclination surface in which a cross-sectional shape is a bent line shape).

In the light-diffusing member 106D illustrated in FIG. 24A, the reflective surface 141Dc of the light-diffusing section 141D has three inclined surfaces in which inclination angles are different from each other, and has an outwardly convex shape.

In the light-diffusing member 106E illustrated in FIG. 24B, the reflective surface 141Ec of the light-diffusing section 141E has three inclined surfaces in which inclination angles are different from each other, and has an inwardly convex shape.

According to the configuration according to this modification example, it is possible to further increase the light diffusibility in comparison to the configuration according to the second embodiment.

Third Embodiment

Hereinafter, a third embodiment of the invention will be described with reference to FIGS. 25, 26A, and 26B.

The basic configuration of a liquid crystal display device of this embodiment is the same as in the first embodiment except that a refractive index adjusting layer 243 is provided to a viewing angle enlarging member 203. Accordingly, in this embodiment, the viewing angle enlarging member 203 will be described.

Figure 25:
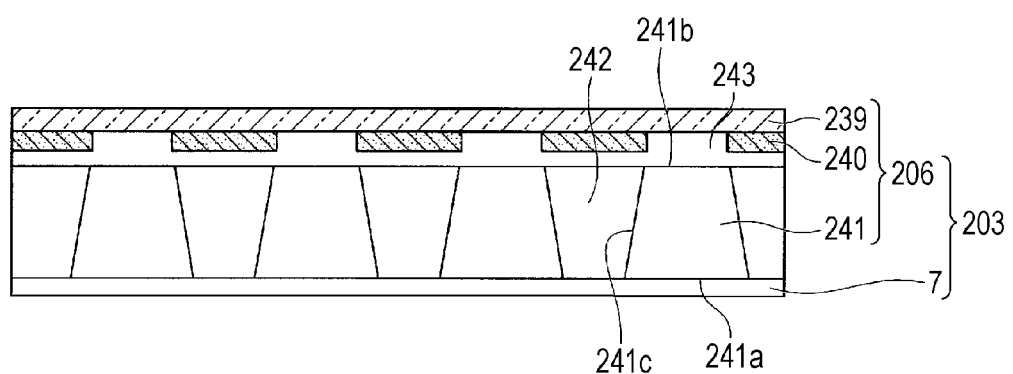
FIG. 25 is a cross-sectional view of a light-diffusing member having a polarizing plate according to a third embodiment.
Figure 26A:
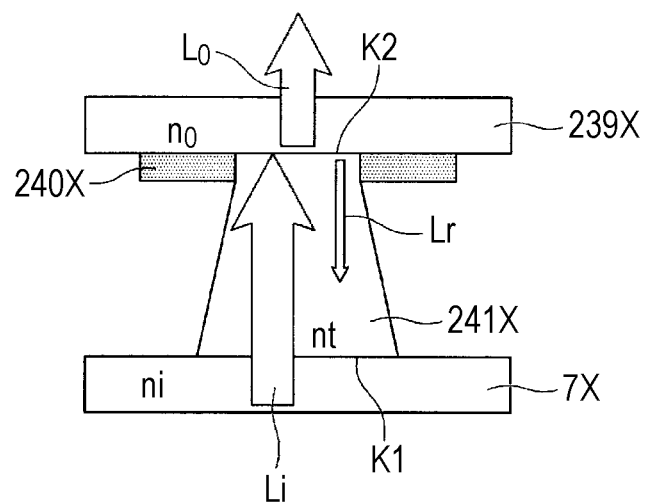
FIG. 26A is a view illustrating operation of a light-diffusing member having a polarizing plate according to a comparative example.

FIG. 25 is a cross-sectional view of the viewing angle enlarging member 203.

The refractive index adjusting layer 243 is provided on the entirety of one surface of a substrate 239 so as to cover a light-shielding layer 240. For example, the refractive index adjusting layer 243 is formed from a light-transmissive organic material such as an acrylic resin and an epoxy resin. As an example of this embodiment, the refractive index adjusting layer 243 is constituted by an acrylic resin having a refractive index of 1.57. A refractive index of the refractive index adjusting layer 243 is set to be smaller than a refractive index of the substrate 239, and to be larger than a refractive index of a light-diffusing section 241 and a refractive index of the second polarizing plate 7. In other words, the refractive index adjusting layer 243 having a refractive index between the refractive index of the second polarizing plate 7 and the refractive index of the substrate 239 is provided between the second polarizing plate 7 and the substrate 239. The refractive index adjusting layer 243 of this embodiment corresponds to "a member having a refractive index between a refractive index of the polarizing plate and a refractive index of the substrate" in claims.

The refractive index adjusting layer 243 may be constituted by only one kind of material, or may be constituted by two or more kinds of material which have refractive indexes different from each other for establishment of the above-described relationship in the refractive index. The refractive index adjusting layer 243 covers the light-shielding layer 240, and has a surface (surface opposite to the substrate 239) that is flat.

Hereinafter, operation of the viewing angle enlarging member 203 according to this embodiment will be described with reference to FIGS. 26A and 26B.

Here, consideration will be given to a liquid crystal display device of a comparative example which does not include the refractive index adjusting layer 243. The liquid crystal display device of the comparative example has the same configuration as that of the display device of this embodiment except that the refractive index adjusting layer 243 is not provided. In this case, in the liquid crystal display device of the comparative example, as illustrated in FIG. 26A, light Li that is emitted from a liquid crystal panel is transmitted through a second polarizing plate 7X, a light-diffusing section 241X, and a substrate 239X in this order, and is emitted toward an observer side. A refractive index ni of the second polarizing plate 7X is 1.50, and a refractive index nt of the light-diffusing section 241X is 1.50. Accordingly, an interface reflection does not occur on an interface K1 between the second polarizing plate 7X and the light-diffusing section 241X. However, the refractive index nt of the light-diffusing section 241X is 1.50, and a refractive index no of the substrate 239X is 1.65. Accordingly, interface reflection occurs on an interface K2 between the light-diffusing section 241X and the substrate 239X. Therefore, a transmittance of light decreases.

According to a simulation performed by the present inventors, light Lr corresponding to 0.23% of light, which is incident perpendicularly to the interface K2 between the light-diffusing section 241X and the substrate 239X, is interface-reflected. As a result, a transmittance of light Lo decreases to 99.77%.

Figure 26B:
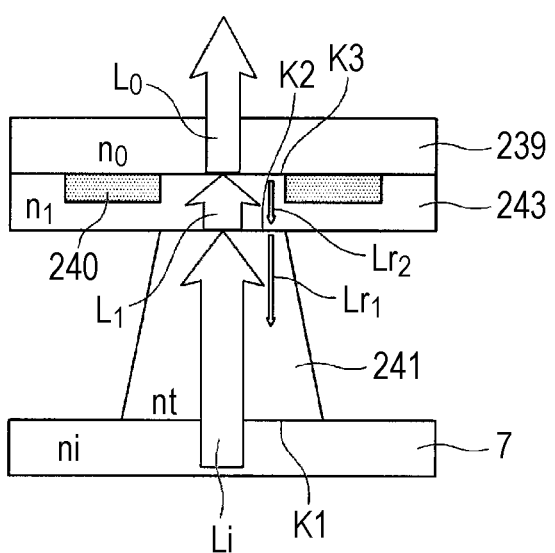
FIG. 26B is a view illustrating operation of the light-diffusing member having a polarizing plate according to the third embodiment.

In contrast, in the liquid crystal display device of this embodiment, as illustrated in FIG. 26B, light Li that is emitted from the liquid crystal panel 2 is transmitted through the second polarizing plate 7, a light-diffusing section 241, the refractive index adjusting layer 243, and the substrate 239 in this order, and is emitted to an observer side. A refractive index ni of the second polarizing plate 7 is 1.50, and a refractive index nt of the light-diffusing section 241 is 1.50. Accordingly, interface reflection does not occur on an interface K1 between the second polarizing plate 7 and the light-diffusing section 241. The refractive index nt of the light-diffusing section 241 is 1.50, and a refractive index n1 of the refractive index adjusting layer 243 is 1.57. Accordingly, slight interface reflection occurs on an interface K2 between the light-diffusing section 241 and the refractive index adjusting layer 243. The refractive index n1 of the refractive index adjusting layer 243 is 1.57, and a refractive index no of the substrate 239 is 1.65. Accordingly, slight interface reflection occurs on an interface K3 between the refractive index adjusting layer 243 and the substrate 239.

According to a simulation performed by the present inventors, light Lr1 corresponding to 0.06% of light which is incident perpendicularly to the interface K2 between the light-diffusing section 241 and the refractive index adjusting layer 243 is interface-reflected. Similarly, light Lr2 corresponding to 0.06% of light L1 that is incident perpendicularly to the interface K3 between the refractive index adjusting layer 243 and the substrate 239 is interface-reflected. As a result, a transmittance of light Lo becomes 99.89%, and is higher in comparison to the comparative example.

According to the viewing angle enlarging member 203 according to this embodiment, the refractive index adjusting layer 243, which has a refractive index that is intermediate between the refractive index of the second polarizing plate 7 and the refractive index of the substrate 239, is interposed between the substrate 239 and the light-diffusing section 241 so as to make a difference in a refractive index on the interface small, thereby reducing interface reflection. As illustrated in FIGS. 26A and 26B, in the comparative example, an interface, on which the interface reflection occurs, is present at one site. In this embodiment, an interface, on which the interface reflection occurs, is present at two sites. A total amount of reflected light according to this embodiment is smaller than that of the comparative example. Accordingly, the transmittance of light is improved, and thus it is possible to realize a liquid crystal display device capable of performing bright display.

Fourth Embodiment

Hereinafter, a fourth embodiment of the invention will be described with reference to FIG. 27 to FIGS. 30(A) and 30(B).

The basic configuration of a liquid crystal display device of this embodiment is the same as in the first embodiment except that a light-scattering portion 345 is partially formed on a surface on a visual recognition side of a substrate 339. Accordingly, in this embodiment, the light-diffusing member 306 will be described.

Figure 27:
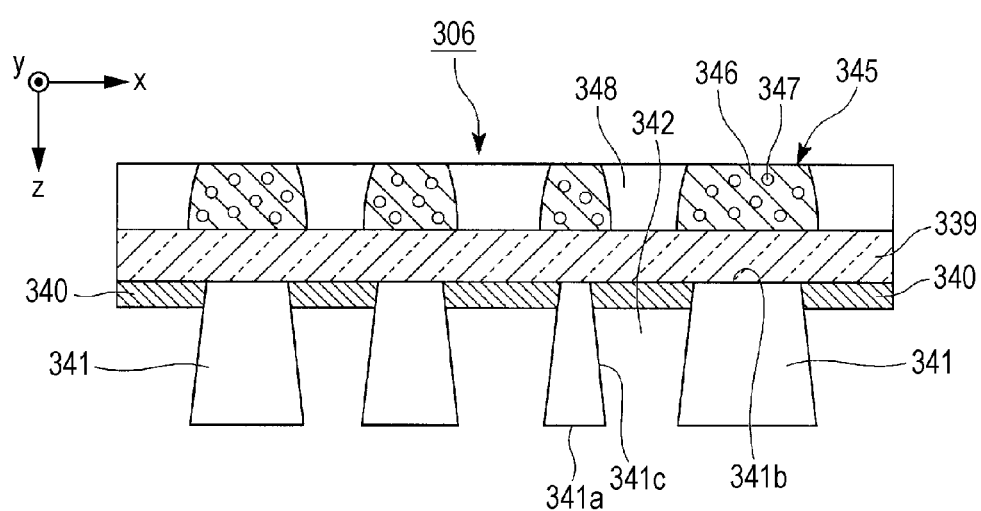
FIG. 27 is a cross-sectional view of a light-diffusing member according to a fourth embodiment.

FIG. 27 is a cross-sectional view of a light-diffusing member 306.

The light-scattering portion 345 has a configuration in which a plurality of scattering bodies 347 are dispersed in a photo-curable resin 346. The thickness of the light-scattering portion 345 (dimension in the Z-axis direction) is approximately 20 μm as an example, and the spherical diameter of the scattering bodies 347 having a spherical shape is approximately 0.5 µm to 20 µm. The light-scattering portion 345 isotropically diffuses light that is diffused by the light-diffusing section 341, thereby further broadening the diffusion with a wide angle.

In this embodiment, the light-scattering portion 345 is formed in a layered shape, and a plurality of holes 348 which pass through the light-scattering portion 345 having the layered shape are formed. Specifically, the plurality of holes 348 which communicate (pass) from a visual recognition side of the light-scattering portion 345 to the substrate 39 are formed in the light-scattering portion 345. The plurality of holes 348 are set in such a manner that an area on a substrate side of the holes 348 which are formed in the light-scattering portion 345 is smaller than an area of the light-shielding layers 40 that come into contact with the substrate 339. In addition, when viewed from a visual recognition side, the holes 348 of the light-scattering portion 345 are disposed on an inner side of the light-shielding portion 340.

As the photo-curable resin 346, for example, a (meth) acrylate-based photo-curable resin, an amide-based photo-curable resin, a silicone-based photo-curable resin, and the like may be used.

As the scattering bodies 347, for example, acrylic beads may be used, but there is no limitation thereto. For example, the scattering bodies 347 may be constituted by an appropriate transparent material such as a resin piece formed from an acryl-based polymer, an olefin-based polymer, a vinyl-based polymer, a cellulose-based polymer, an amide-based polymer, a fluorine-based polymer, an urethane-based polymer, a silicone-based polymer, an imide-based polymer, or the like, and glass beads.

In addition, as the scattering bodies 347, s scattering body and a reflective body which do not adsorb light may be used in addition to the transparent materials. Alternatively, the scattering bodies 347 may be air bubbles which are diffused in the light-diffusing section 341. For example, a shape of individual scattering bodies 347 may be set to various kinds of shapes such as a spherical shape, an elliptical spherical shape, a flat plate shape, and a polygonal cube. The size of the scattering bodies 347 may be uniform or non-uniform.

Hereinafter, operation of the light-diffusing member 306 according to this embodiment will be described with reference to FIG. 28A to FIG. 30B.

Figure 28A:
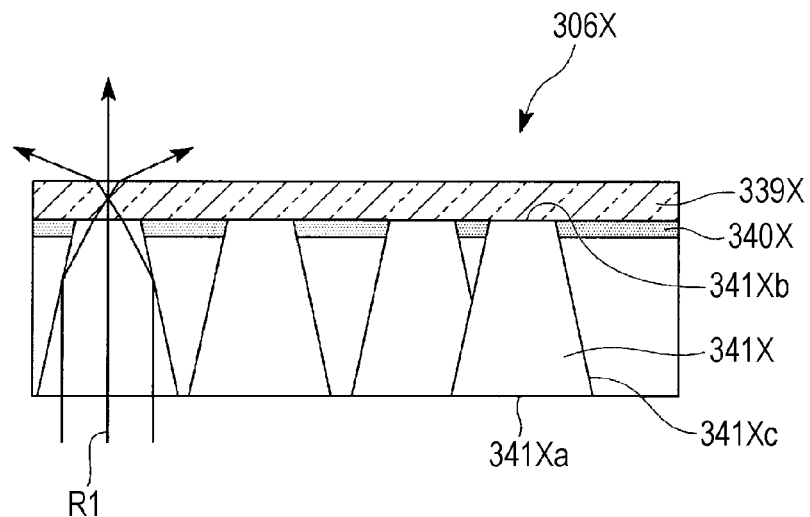
FIG. 28A is a view illustrating an optical propagation path of light in a case where a light-scattering portion is not formed.

As illustrated in FIG. 28A, in a case of a light-diffusing member 306X in which the light-scattering portion 345 is not disposed, light R1 that is incident perpendicularly to a light-incident end surface 341Xa of a light-diffusing section 341X is emitted from a light-emitting end surface 341Xb in a manner of being concentrated to a specific diffusion angle. As a result, it is difficult to uniformly diffuse light in a wide angle range, and bright display is obtained only at a specific viewing angle.

Figure 28B:
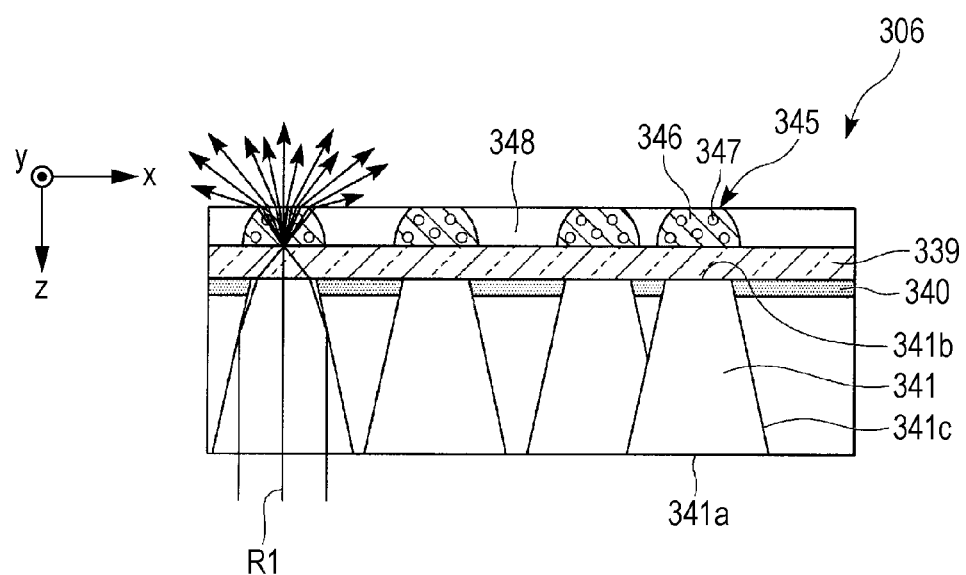
FIG. 28B is a view illustrating the optical propagation path of light in a case where the light-scattering portion is formed.

In contrast, in a case of this embodiment, as illustrated in FIG. 28B, the light-scattering portion 345 is disposed on an outermost surface of the light-diffusing member 306. Accordingly, light R1 that is incident perpendicularly to a light-incident end surface 341a of the light-diffusing section 341 is diffused at the light-diffusing section 341, and is further diffused at the light-scattering portion 345. Accordingly, light is emitted from the light-scattering portion 345 at various angles.

As described above, in the case of this embodiment, the light-scattering portion 345 is disposed on the outermost surface of the light-diffusing member 306, and thus it is possible to make the diffusion angle of light not be concentrated to one angle. As a result, it is possible to make the light-diffusing characteristics of the light-diffusing member 306 more smooth, and thus bright display is obtained at a wide viewing angle.

In addition, in this embodiment, the plurality of holes 348, which communicate from visual recognition side to the substrate, are formed in the light-scattering portion 345 that is formed on a surface on the visual recognition side of the substrate 339.

Figure 29A:
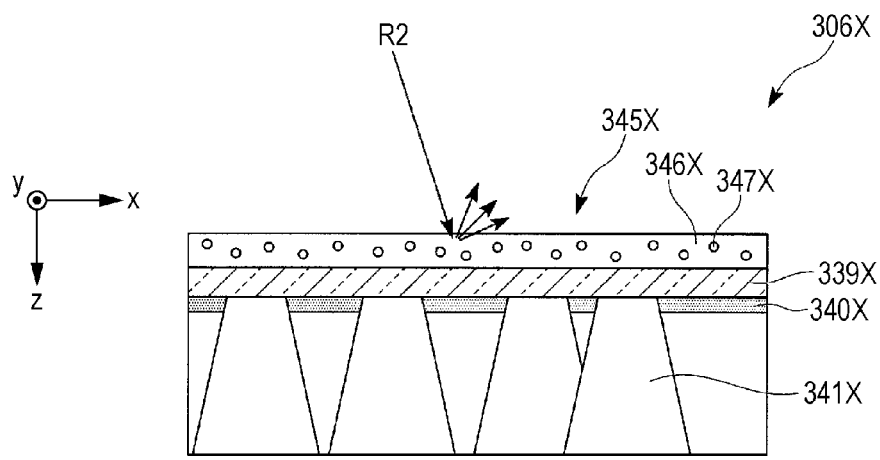
FIG. 29A is a view illustrating reflection and scattering of external light in a case where the light-scattering portion is formed on the entire surface of a substrate.

Here, consideration will be given to a case where a light-scattering portion 345X is formed on the entirety of a surface on the visual recognition side of the substrate 339. In this case, as illustrated in FIG. 29A, light R2 (external light) on the visual recognition side is incident to the light-scattering portion 345, the external light R2 is reflected and scattered (backward scattering) by the light-scattering portion 345, and propagates toward the visual recognition side. In this case, scattered light of the external light R2 is recognized to a viewer, and thus visibility of liquid crystal display deteriorates.

Figure 29B:
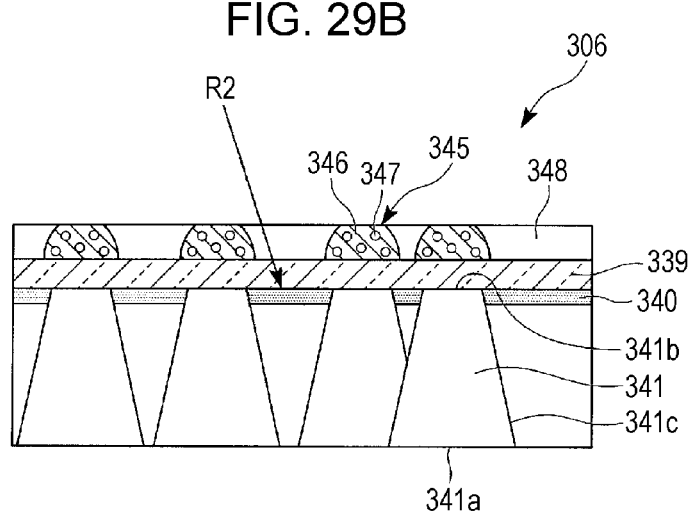
FIG. 29B is a view illustrating reflection and scattering of external light of a light-diffusing member according to the fourth embodiment.

In contrast, in the case of this embodiment, as described above, the holes 348 are formed in the light-scattering portion 345. The light R2 (external light) that is incident to the holes 348 from the visual recognition side is absorbed to the light-shielding portion 340 as illustrated in FIG. 29B, and reflection and scattering do not occur. Accordingly, it is possible to suppress reflection and scattering of the light R2 on the visual recognition side in comparison to the case where the light-scattering portion 345 is formed on the entire surface of the substrate 339, and thus visibility becomes satisfactory.

In addition, in this embodiment, since the light-scattering portion 345 is formed at a position that is opposite to the light-diffusing section 341, it is possible to suppress reflection and scattering of light on the visual recognition side without deteriorating the light-diffusing characteristics of light from a rear surface side. That is, according to the light-diffusing member 306 of this embodiment, it is possible to make the light-diffusing characteristics of light on the rear surface side and the reflection and scattering characteristics of light on the visual recognition side compatible with each other.

In addition, in this embodiment, the light-scattering portion 345 is set in such a manner that the area on the substrate 339 side of the holes 348 which are formed in the light-scattering portion 345 is set to be smaller than the area of the light-shielding portion 340 that is in contact with the substrate 339. In addition, the holes 348 of the light-scattering portion 345 are disposed on an inner side of the light-shielding portion 340 when viewed on the visual recognition side (in a plan view).

Figure 30A:
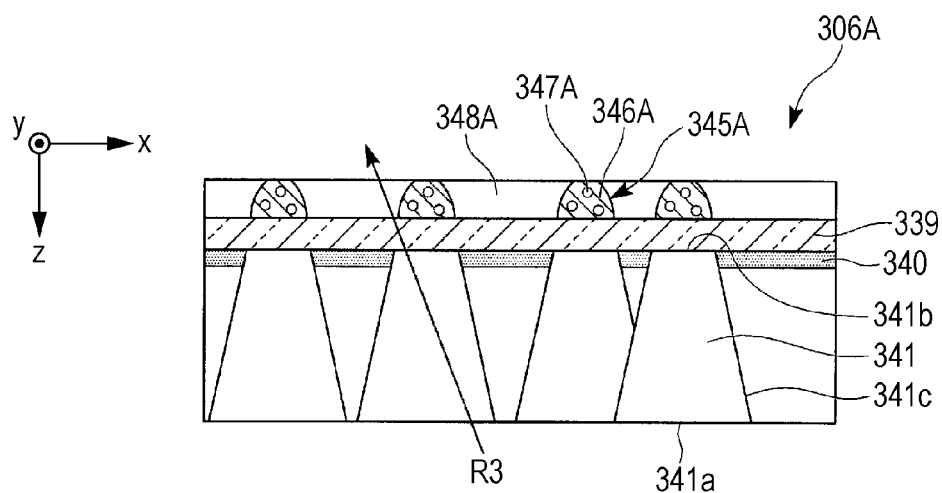
FIG. 30A is a view illustrating a relationship between a region in which the light-scattering portion is formed and light that is scattered.

As illustrated in FIG. 30A, at a position that is opposite to the light-shielding portion 340, in a case where the area on the substrate 339 side of the holes 348A is set to be equal to that of the light-shielding portion 340, light R3 on a rear surface side may not be scattered by the light-scattering portion 345A.

Figure 30B:
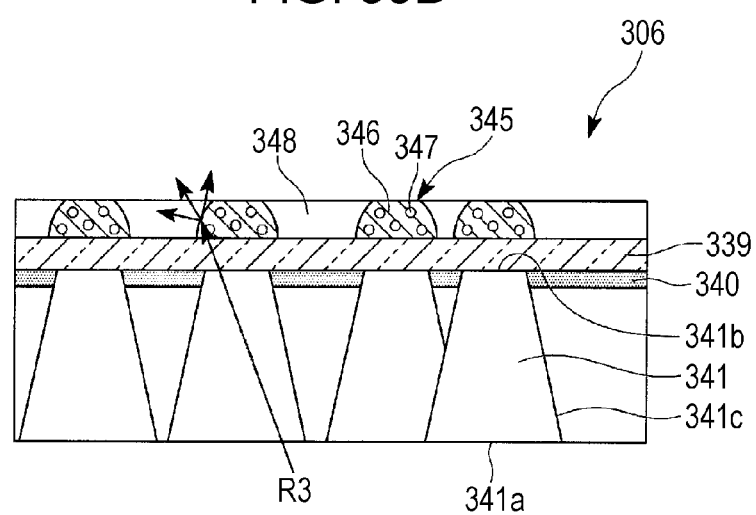
FIG. 30B is a view illustrating a relationship between a region in which the light-scattering portion is formed and light that is scattered.

In contrast, in the case of this embodiment, as illustrated in FIG. 30B, light R3, which is incident to a surface of the substrate 339 from the rear surface side in a diagonal line direction, can be scattered by the light-scattering portion 345. Accordingly, it is possible to further improve the light-diffusing characteristics.

Fifth Embodiment

Hereinafter, a fifth embodiment of the invention will be described with reference to FIG. 31.

The basic configuration of a liquid crystal display device of this embodiment is the same as in the first embodiment except that a part of a surface 440a of each of light-shielding layers 440, which is opposite to a substrate 439, is covered with a light-scattering portion 445. Accordingly, in this embodiment, a light-diffusing member 406 will be described.

Figure 31:
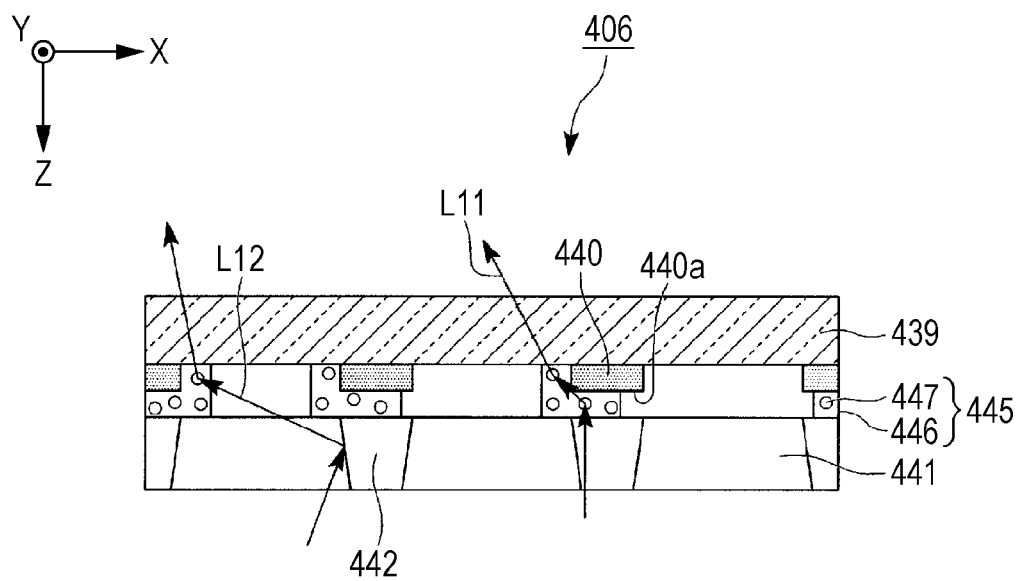
FIG. 31 is a cross-sectional view of a light-diffusing member according to a fifth embodiment.

FIG. 31 is a cross-sectional view of the light-diffusing member 406.

The light-scattering portion 445 has a configuration in which a plurality of scattering bodies 447 are dispersed inside a photo-curable resin 446. The light-scattering portion 445 is disposed between a hollow portion 442 and the light-shielding layer 440. The light-scattering portion 445 is disposed on one surface (surface opposite to a visual recognition side) of a substrate 439 in a state of covering the light-shielding layer 440 while partially exposing the light-shielding layer 440. That is, in this embodiment, when viewed from the visual recognition side (in a plan view), a part of the light-shielding layer 440 protrudes from a region in which the light-scattering portion 445 is formed.

In a case of this embodiment, a part L11 of light, which is incident to the hollow portion 442, is incident to the light-scattering portion 445, is forwardly scattered therein, and is guided to a region in which the light-shielding layer 440 is not formed.

Accordingly, the light-diffusing member 406 can emit a part of the incident light from the hollow portion 442 through the substrate 439 at various angles, and thus it is possible to obtain high light usage efficiency. In addition, the light-diffusing member 406 can scatter a part L12 of light, which is incident to a light-diffusing section 441 at the inside of the light-scattering portion 445, to be emitted at various angles with respect to the substrate 439.

In addition, in this embodiment, the description has been given to a case in which a part of the surface of the light-shielding layer which is opposite to the substrate is covered with the light-scattering portion as an example, but there is no limitation thereto. For example, the light-scattering portion may be formed to cover the entire surface of the light-shielding layer. That is, at least a part of the surface of the light-shielding layer which is opposite to the substrate may be covered with the light-scattering portion.

In addition, in the first embodiment, the description has been given to a case in which the shape of the light-shielding layer 40 is set to an elongated elliptical shape as illustrated in FIG. 31A, but the shape of the light-shielding layer 40 is not limited thereto.

Figure 32A:
FIG. 32A is a plan view illustrating another example of the light-shielding layer of the light-diffusing member.
Figure 32B:
FIG. 32B is a plan view illustrating still another example of the light-shielding layer of the light-diffusing member.

For example, as illustrated in FIG. 32B, a light-shielding layer 40G having an elongated rectangular shape may be used.

Figure 32C:
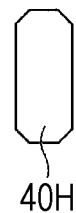
FIG. 32C is a plan view illustrating still another example of the light-shielding layer of the light-diffusing member.

Alternatively, as illustrated in FIG. 32C, a light-shielding layer 40H having an elongated octagonal shape may be used.

Figure 32D:
FIG. 32D is a plan view illustrating still another example of the light-shielding layer of the light-diffusing member.
Figure 32E:
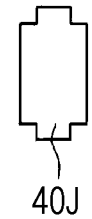
FIG. 32E is a plan view illustrating still another example of the light-shielding layer of the light-diffusing member.
Figure 32F:
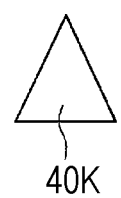
FIG. 32F is a plan view illustrating still another example of the light-shielding layer of the light-diffusing member.
Figure 32G:
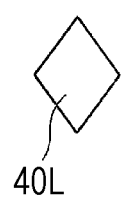
FIG. 32G is a plan view illustrating still another example of the light-shielding layer of the light-diffusing member.

Alternatively, as illustrated in FIG. 32D, a light-shielding layer 40I having a shape in which two opposite sides of an elongated rectangle are outwardly curved may be used. Alternatively, as illustrated in FIG. 32E, a light-shielding layer 40j having a shape in which two rectangles having aspect ratios different from each other are made to intersect each other in two directions perpendicular to each other may be used. Alternatively, as illustrated in FIG. 32F, a light-shielding layer 40K having an isosceles triangular shape may be used. Alternatively, as illustrated in FIG. 32G, a light-shielding layer 40L having a diamond shape may be used. Alternatively, the shapes of FIGS. 32A to 32G may be rotated in a predetermined direction.

In addition, the planar shapes of the light-shielding layers 40 may be made different from each other, and thus a plurality of kinds of different sizes and shapes, which have various kinds of anisotropic azimuths (refer to FIGS. 32A to 32G), may be mixed-in.

As described above, even in a case where the planar shapes of the light-shielding layers 40 are made to be different from each other to have various kinds of anisotropic azimuths, the azimuth angle direction Vs in which the diffusibility of the light-diffusing member 6 is relatively strong, and the transmission axis P2 of the second polarizing plate 7 may be set to be approximately parallel with each other. According to this, even in the configuration having the various kinds of anisotropic azimuths, it is possible to improve the contrast ratio, thereby obtaining high display quality.

In addition, in the second embodiment, the description has been given to a case where the shape of the light-diffusing section 141 is set to an elliptical shape as illustrated in FIG. 32A, but the shape of the light-diffusing section 141 is not limited thereto.

For example, as illustrated in FIGS. 32B to 32G, the shape of the light-diffusing section 141 may be set to an elongated rectangular shape, an elongated octagonal shape, a shape in which two opposite sides of an elongated rectangle are outwardly curved, a shape in which two rectangles having aspect ratios different from each other are made to intersect each other in two directions perpendicular to each other, an isosceles triangular shape, a diamond shape, or shapes obtained by rotating these shapes in a predetermined direction.

In addition, the planar shapes of the light-diffusing sections 141 may be made different from each other, and thus a plurality of kinds of different sizes and shapes, which have various kinds of anisotropic azimuths (refer to FIGS. 32A to 32G), may be mixed-in.

As described above, even in a case where the planar shapes of the light-shielding layers 40 are made to be different from each other to have various kinds of anisotropic azimuths, the azimuth angle direction Vs in which the diffusibility of the light-diffusing member 6 is relatively strong, and the transmission axis P2 of the second polarizing plate 7 may be set to be approximately parallel with each other. According to this, even in the configuration having the various kinds of anisotropic azimuths, it is possible to improve the contrast ratio, thereby obtaining high display quality.

In addition, at least one of an anti-reflective layer, a polarizing filter layer, an antistatic layer, an anti-glare treatment layer, and an anti-fouling treatment layer may be provided on a substrate visual-recognition side of the viewing angle enlarging member in the above-described embodiments.

According to this configuration, in accordance with a kind of layers which are provided on the visual recognition side of the substrate, a function of reducing reflection of external light, a function of preventing attaching of dust or contaminant, a function of preventing a damage, and the like can be applied, and thus it is possible to prevent deterioration of visual angle characteristics with the passage of time.

In addition, the technical scope of the invention is not limited to the above-described embodiments, and various modifications can be added in a range not departing from the gist of the invention.

In addition, in the above-described embodiments, the description has been given to a case where the shape of the light-diffusing section or spatial portion is set to truncated elliptical cone shape, but the other shapes are also possible. In addition, the inclination angle of the reflective surface of the light-diffusing section may not be symmetrical about an optical axis. In a case where the shape of the light-diffusing sections is set to the truncated elliptical cone shape similar to the above-described embodiments, inclination angles of the reflective surfaces of the light-diffusing section are line-symmetric about the optical axis, and thus a line-symmetric angle distribution about the optical axis is obtained. In contrast, in a case where an asymmetric angle distribution is intentionally desired in accordance with a usage or a using method of the display device, for example, in a case of desiring to broaden a viewing angle only on an upper side or a right side of a screen, the inclination angles of the reflective surface of the light-diffusing section may be made to be asymmetric.

In addition, in the above-described embodiments, as a method of producing the liquid crystal display device, the description has been given to a case where the viewing angle enlarging member that is completed is attached to the liquid crystal panel by using an optical adhesive and the like in a state in which the substrate is set as a visual recognition side, and the second polarizing plate is made to face the liquid crystal panel as an example, but there is no limitation thereto. For example, the light-diffusing member may be attached to the liquid crystal panel having a polarizing plate later. In this case, the azimuth angle direction Vs in which the diffusibility of the light-diffusing member is relatively strong, and the transmission axis P2 of the second polarizing plate are made to be approximately parallel with each other (to match each other).

In addition, specific configurations relating to materials, the number, disposition, and the like of respective constituent members of the liquid crystal display device are not limited to the above-described embodiments, and may be appropriately modified. For example, in the above-described embodiments, the description has been given to an example in which the polarizing plate is disposed on an outer side of the liquid crystal panel. However, instead of the configuration, the polarizing layer may be formed on an inner side of a pair of substrates which constitute the liquid crystal panel.

INDUSTRIAL APPLICABILITY

The invention is applicable to various display devices such as a liquid crystal display device, an organic electroluminescence display device, a plasma display, an LED display, and an MEMS display.

REFERENCE SIGNS LIST 1, 1A, 1B, 1C Liquid crystal display device (display device)
2 Liquid crystal panel (display body)
3, 203 Viewing angle enlarging member (light-diffusing member having polarizing plate)
6, 6A, 6B, 6C, 106, 106A, 106B, 106C, 106D, 106E, 206, 306, 406 Light-diffusing member
7 Second polarizing plate (polarizing plate)
11 Liquid crystal layer
39, 139, 239, 339, 439 Substrate
40, 40G, 40H, 40I, 40J, 40K, 40L, 140, 140A, 140B, 140C, 140D, 140E, 240, 340, 440 Light-shielding layer
41, 141, 141A, 141B, 141C, 141D, 141E, 241, 341, 441 Light-diffusing section
41$a$, 141$a$, 141Aa, 241$a$, 341$a$ Light-emitting end surface
41$b$, 141$b$, 141Ab, 241$b$, 341$b$ Light-incident end surface
41$c$, 141$c$, 141Ac, 141Bc, 141Cc, 141Dc, 141Ec, 241$c$, 341$c$ Reflective surface
42, 142, 242, 442 Hollow portion
243 Refractive index adjusting layer (member having refractive index between refractive index of polarizing plate and refractive index of substrate)
345, 445 Light-scattering portion
440$a$ Surface of light-shielding layer which is opposite to substrate
φ Azimuth angle
Vs Azimuth angle direction in which diffusibility of light-diffusing member is relatively strong
P2 Transmission axis of second polarizing plate (transmission axis of polarizing plate)

The invention claimed is:

1. A light-diffusing member having a polarizing plate, comprising:
a light-diffusing member including a light-transmissive substrate, a plurality of light-shielding layers which are formed on one surface of the substrate, and a light-diffusing section that is formed in regions on the one surface of the substrate other than regions in which the light-shielding layers are formed; and
a polarizing plate that is disposed on a side opposite to a substrate side of the light-diffusing member,
wherein the light-diffusing member is configured to diffuse light, which is incident from a polarizing plate side, in an anisotropic manner in an azimuth angle direction viewed from a normal direction of the substrate,
the light-diffusing section has a light-emitting end surface that is in contact with the substrate, a light-incident end surface that is opposite to the light-emitting end surface and has an area larger than an area of the light-emitting end surface, and a reflective surface that is in contact with the light-emitting end surface and the light-incident end surface and reflects light incident from the light-incident end surface,
a height of the light-diffusing section from the light-incident end surface to the light-emitting end surface is set to be larger than a layer thickness of the light-shielding layers, and
an azimuth angle direction in which diffusibility of the light-diffusing member is relatively strong, and a transmission axis of the polarizing plate are approximately parallel with each other.

2. The light-diffusing member having a polarizing plate according to claim 1,
wherein a planar shape of the light-shielding layers when viewed from a normal direction of one surface of the substrate is an anisotropic shape that has at least a major axis and a minor axis.

3. The light-diffusing member having a polarizing plate according to claim 2,
wherein the planar shape of the light-shielding layers when viewed from the normal direction of the one surface of the substrate is an elliptical shape or a polygonal shape.

4. The light-diffusing member having a polarizing plate according to claim 2,
wherein the plurality of light-shielding layers have at least one among a plurality of kinds of sizes and shapes which are different from each other when viewed from the normal direction of the one surface of the substrate.

5. The light-diffusing member having a polarizing plate according to claim 1, wherein hollow portions, which are partitioned by the regions in which the light-diffusing section is formed, are formed in the regions in which the light-shielding layers are formed, and air exists in the hollow portions.

6. The light-diffusing member having a polarizing plate according to claim 1, wherein a member, which has a refractive index between a refractive index of the polarizing plate and a refractive index of the substrate, is provided between the polarizing plate and the substrate.

7. The light-diffusing member having a polarizing plate according to claim 1, wherein a light-scattering portion is partially formed on a surface of the substrate which is opposite to the one surface.

8. The light-diffusing member having a polarizing plate according to claim 1, wherein at least a part of a surface of the light-shielding layer, which is opposite to the substrate, is covered with a light-scattering portion.

9. The light-diffusing member having a polarizing plate according to claim 1, wherein at least one of an anti-reflective layer, an anti-static layer, an anti-glare treatment layer, and an anti-fouling treatment layer is provided on a surface of the substrate which is opposite to the one surface.

10. A display device, comprising:

a display body; and a viewing angle enlarging member which is provided on a visual recognition side of the display body, and emits light in a state in which an angle distribution of the light incident from the display body is broadened from an angle distribution prior to incidence, wherein the viewing angle enlarging member is constituted by the light-diffusing member having the polarizing plate according to claim 1, the display body has a plurality of pixels which constitute a display image, and a maximum size of a plurality of light-shielding layers of the light-diffusing member is smaller than a pixel size of the display body.

11. A light-diffusing member having a polarizing plate, comprising:

a light-diffusing member including a light-transmissive substrate, a plurality of light-diffusing sections which are formed on one surface of the substrate, and a light-shielding layer that is formed in a region on the one surface of the substrate other than regions in which the light-diffusing sections are formed; and a polarizing plate that is disposed on a side opposite to a substrate side of the light-diffusing member, wherein the light-diffusing member is configured to diffuse light, which is incident from a polarizing plate side, in an anisotropic manner in an azimuth angle direction viewed from a normal direction of the substrate, the light-diffusing sections have a light-emitting end surface that is in contact with the substrate, a light-incident end surface which is opposite to the light-emitting end surface and has an area larger than an area of the light-emitting end surface, and a reflective surface that is in contact with the light-emitting end surface and the light-incident end surface and reflects light incident from the light-incident end surface, a height of the light-diffusing sections from the light-incident end surface to the light-emitting end surface is set to be larger than a layer thickness of the light-shielding layer, and an azimuth angle direction in which diffusibility of the light-diffusing member is relatively strong, and a transmission axis of the polarizing plate are approximately parallel with each other.

12. The light-diffusing member having a polarizing plate according to claim 11, wherein a planar shape of the light-diffusing sections when viewed from a normal direction of one surface of the substrate is an anisotropic shape that has at least a major axis and a minor axis.

13. The light-diffusing member having a polarizing plate according to claim 12, wherein the planar shape of the light-diffusing sections when viewed from the normal direction of the one surface of the substrate is an elliptical shape or a polygonal shape.

14. The light-diffusing member having a polarizing plate according to claim 12, wherein the plurality of light-diffusing sections have at least one among a plurality of kinds of sizes and shapes which are different from each other when viewed from the normal direction of the one surface of the substrate.

15. The light-diffusing member having a polarizing plate according to claim 11, wherein air exists in gaps between the plurality of light-diffusing sections.

16. The light-diffusing member having a polarizing plate according to claim 11, wherein when the light-diffusing member is viewed from a cross-section that is cut-out along a plane including the normal direction of the one surface of the substrate and the azimuth angle direction in which the diffusibility of the light-diffusing member is relatively strong, an inclination angle of a side surface of at least one light-diffusing section among the plurality of light-diffusing sections is different from an inclination angle of a side surface of other light-diffusing sections.

17. The light-diffusing member having a polarizing plate according to claim 11, wherein when the light-diffusing member is viewed from a cross-section that is cut-out along a plane including the normal direction of the one surface of the substrate and the azimuth angle direction in which the diffusibility of the light-diffusing member is relatively strong, an inclination angle of a side surface of at least one light-diffusing section among the plurality of light-diffusing sections is different depending on location.

18. A display device, comprising:

a display body; and a viewing angle enlarging member which is provided on a visual recognition side of the display body, and emits light in a state in which an angle distribution of the light incident from the display body is broadened from an angle distribution prior to incidence, wherein the viewing angle enlarging member is constituted by the light-diffusing member having the polarizing plate according to claim 11, the display body has a plurality of pixels which constitute a display image, and a maximum pitch between light-diffusing sections adjacent to each other among the plurality of light-diffusing sections of the light-diffusing member is smaller than a pitch between the pixels of the display body.

19. A method of producing a light-diffusing member having a polarizing plate, comprising:
  a step of forming a plurality of light-shielding layers on one surface of a light-transmissive substrate;
  a step of forming a light-transmissive negative type photosensitive resin layer on the one surface of the substrate so as to cover the plurality of light-shielding layers;
  a step of irradiating the negative type photosensitive resin layer with diffused light from a surface of the substrate, which is opposite to the one surface on which the light-shielding layers and the negative type photosensitive resin layer are formed, through the substrate in regions other than regions in which the light-shielding layers are formed;
  a step of preparing a light-diffusing member configured to diffuse light, which is incident from a light-incident end surface side of the light-diffusing section, in an anisotropic manner in an azimuth angle direction viewed from a normal direction of the substrate by developing the negative type photosensitive resin layer after completion of the irradiation with the diffused light to form the light-diffusing section, which has a light-emitting end surface that is in contact with the substrate, a light-incident end surface which is opposite to the light-emitting end surface and has an area larger than an area of the light-emitting end surface, and a reflective surface that is in contact with the light-emitting end surface and the light-incident end surface and reflects light incident from the light-incident end surface, on one surface of the substrate; and
  a step of attaching a polarizing plate to the light-incident end surface of the light-diffusing section of the light-diffusing member to prepare the light-diffusing member having the polarizing plate,
  wherein in the step of preparing the light-diffusing member having the polarizing plate, an azimuth angle direction in which diffusibility of the light-diffusing member is relatively strong, and a transmission axis of the polarizing plate are made to be approximately parallel with each other.

20. The method of producing a light-diffusing member having a polarizing plate according to claim 19,
  wherein as a material of the light-shielding layer, any one of a black resin, a black ink, an elementary metal substance, and a multilayer film of the elementary metal substance and a metal oxide is used.

* * * * *